(12) United States Patent
Cyrulik et al.

(10) Patent No.: US 12,162,697 B2
(45) Date of Patent: Dec. 10, 2024

(54) MAINTENANCE ACCESS ZONES FOR STORAGE AND RETRIEVAL SYSTEMS

(71) Applicant: SYMBOTIC LLC, Wilmington, MA (US)

(72) Inventors: Michael Cyrulik, Hollis, NH (US); Robert Sullivan, Wilmington, MA (US)

(73) Assignee: Symbotic LLC, Wilmington, MA (US)

( * ) Notice: Subject to any disclaimer, the term of this patent is extended or adjusted under 35 U.S.C. 154(b) by 41 days.

(21) Appl. No.: 18/302,432

(22) Filed: Apr. 18, 2023

(65) Prior Publication Data
US 2023/0249923 A1  Aug. 10, 2023

Related U.S. Application Data

(63) Continuation of application No. 17/229,596, filed on Apr. 13, 2021, now Pat. No. 11,629,015, which is a continuation of application No. 16/716,130, filed on Dec. 16, 2019, now Pat. No. 10,974,910, which is a continuation of application No. 16/358,506, filed on
(Continued)

(51) Int. Cl.
| | |
|---|---|
| *G06F 7/00* | (2006.01) |
| *B65G 1/00* | (2006.01) |
| *B65G 1/04* | (2006.01) |
| *B65G 1/06* | (2006.01) |
| *B65G 1/137* | (2006.01) |
| *B65G 47/88* | (2006.01) |

(52) U.S. Cl.
CPC ......... *B65G 47/883* (2013.01); *B65G 1/0492* (2013.01); *B65G 1/06* (2013.01); *B65G 1/1373* (2013.01)

(58) Field of Classification Search
CPC ...... B65G 47/883; B65G 1/0492; B65G 1/06; B65G 1/1373; B65G 2207/40
USPC .................................. 414/281; 700/213, 214
See application file for complete search history.

(56) References Cited

U.S. PATENT DOCUMENTS

| | | |
|---|---|---|
| 771,152 A | 9/1904 | Hoyle |
| 1,887,667 A | 11/1932 | Wheeler |
| (Continued) | | |

FOREIGN PATENT DOCUMENTS

| | | |
|---|---|---|
| EP | 2436620 | 4/2012 |
| JP | 53089180 | 8/1978 |
| (Continued) | | |

*Primary Examiner* — Yolanda R Cumbess
(74) *Attorney, Agent, or Firm* — Perman & Green, LLP

(57) ABSTRACT

A maintenance access system for a storage and retrieval system having a storage and retrieval space and automated transport vehicles disposed in the space. The system includes at least one maintenance access control unit associated with a portion of the space, at least one barrier in the space and defining a boundary of the portion of the space and configured to substantially prevent the passage of the vehicles past the at least one barrier, and a controller connected to the control unit, the controller being configured to receive a signal from the at least one control unit for isolating the portion of the space associated with the at least one control unit, where the controller in response to the signal closes the at least one barrier isolating the portion of the space and effects the removal from or shutting down of vehicles within the portion of the space.

14 Claims, 14 Drawing Sheets

Related U.S. Application Data

Mar. 19, 2019, now Pat. No. 10,507,988, which is a continuation of application No. 16/018,313, filed on Jun. 26, 2018, now Pat. No. 10,233,037, which is a continuation of application No. 15/465,347, filed on Mar. 21, 2017, now Pat. No. 10,005,624, which is a continuation of application No. 15/290,764, filed on Oct. 11, 2016, now Pat. No. 9,598,237, which is a continuation of application No. 14/244,394, filed on Apr. 3, 2014, now Pat. No. 9,463,925, which is a continuation of application No. 13/326,565, filed on Dec. 15, 2011, now Pat. No. 8,694,152.

(60) Provisional application No. 61/423,308, filed on Dec. 15, 2010.

(56) References Cited

U.S. PATENT DOCUMENTS

| | | |
|---|---|---|
| 3,661,280 A | 5/1972 | Atwater |
| 3,738,506 A | 6/1973 | Cornford et al. |
| 3,845,715 A | 11/1974 | Hochstrasser |
| 4,394,104 A | 7/1983 | Camerini et al. |
| 4,415,975 A | 11/1983 | Burt |
| 4,492,504 A | 1/1985 | Hainsworth |
| 4,678,390 A | 7/1987 | Bonneton |
| 4,883,401 A | 11/1989 | Kavieff |
| 4,967,370 A | 10/1990 | Stern et al. |
| 5,337,880 A | 8/1994 | Claycomb et al. |
| 5,370,492 A | 12/1994 | Gleyze et al. |
| 5,559,696 A | 9/1996 | Borenstein |
| 5,615,992 A | 4/1997 | Proske et al. |
| 5,798,920 A | 8/1998 | Crucius et al. |
| 5,801,506 A | 9/1998 | Netzler |
| 5,974,348 A | 10/1999 | Rocks |
| 6,061,607 A * | 5/2000 | Bradley .............. B65G 1/1376 414/280 |
| 6,124,805 A | 9/2000 | Gabbard |
| 6,213,704 B1 | 4/2001 | White et al. |
| 6,295,922 B1 | 10/2001 | Salamone et al. |
| 6,463,360 B1 | 10/2002 | Terada et al. |
| 6,597,143 B2 | 7/2003 | Song et al. |
| 6,663,334 B2 | 12/2003 | Warhurst et al. |
| 6,922,632 B2 | 7/2005 | Foxlin |
| 7,039,501 B2 | 5/2006 | Freeman et al. |
| 7,065,391 B2 | 6/2006 | Kanayama et al. |
| 7,069,124 B1 | 6/2006 | Whittaker et al. |
| 7,101,139 B1 | 9/2006 | Benedict |
| 7,283,810 B1 | 10/2007 | Arakawa et al. |
| 7,284,652 B2 | 10/2007 | Zeitler et al. |
| 7,431,268 B2 | 9/2008 | Lee et al. |
| 7,456,596 B2 | 11/2008 | Goodall et al. |
| 7,499,155 B2 | 3/2009 | Cappelletti et al. |
| 7,568,572 B2 | 8/2009 | Zeitler et al. |
| 7,575,406 B2 | 8/2009 | Hofmeister et al. |
| 7,686,560 B2 | 3/2010 | Laurin et al. |
| 7,693,757 B2 | 4/2010 | Zimmerman |
| 7,695,235 B1 | 4/2010 | Rallis |
| 7,706,917 B1 | 4/2010 | Chiappetta et al. |
| 7,725,253 B2 | 5/2010 | Foxlin |
| 7,729,801 B2 | 6/2010 | Abramson |
| 7,771,152 B2 | 8/2010 | Waltersbacher |
| 7,783,383 B2 | 8/2010 | Eliuk et al. |
| 7,813,820 B2 | 10/2010 | Opem et al. |
| 7,826,919 B2 | 11/2010 | Dandrea et al. |
| 7,873,469 B2 | 1/2011 | Dandrea et al. |
| 7,894,917 B2 | 2/2011 | Weatherhead et al. |
| 7,931,431 B2 | 4/2011 | Benedict et al. |
| 7,944,368 B2 | 4/2011 | Carter et al. |
| 7,959,395 B2 | 6/2011 | Hofmeister et al. |
| 7,963,384 B2 | 6/2011 | Lafontaine |
| 7,972,102 B2 | 7/2011 | Ward et al. |
| 7,974,736 B2 | 7/2011 | Morin et al. |
| 7,988,398 B2 | 8/2011 | Hofmeister et al. |
| 8,006,824 B2 | 8/2011 | Wada et al. |
| 8,046,103 B2 | 10/2011 | Abramson |
| 8,046,160 B2 | 10/2011 | Carter et al. |
| 8,090,993 B2 | 1/2012 | Yoshida et al. |
| 8,193,917 B2 | 6/2012 | Schmickley et al. |
| 8,892,241 B2 | 11/2014 | Weiss |
| 9,120,622 B1 | 9/2015 | Elazary et al. |
| 9,205,979 B2 | 12/2015 | Steinbach |
| 11,385,634 B2 | 7/2022 | Dorval et al. |
| 2002/0037208 A1 | 3/2002 | Patrito |
| 2002/0143461 A1 | 10/2002 | Burns et al. |
| 2002/0159879 A1 | 10/2002 | Elger |
| 2003/0069665 A1 | 4/2003 | Haag |
| 2004/0017929 A1 | 1/2004 | Bramblet et al. |
| 2004/0018817 A1 | 1/2004 | Kanayama et al. |
| 2006/0043111 A1 | 3/2006 | Jennings et al. |
| 2007/0061041 A1 | 3/2007 | Zweig et al. |
| 2007/0065258 A1 | 3/2007 | Benedict et al. |
| 2007/0065259 A1* | 3/2007 | Talley ................ B65G 1/0407 414/279 |
| 2007/0071585 A1 | 3/2007 | Henkel |
| 2007/0276535 A1 | 11/2007 | Haag |
| 2008/0044262 A1 | 2/2008 | Kim et al. |
| 2008/0075357 A1 | 3/2008 | Yoon et al. |
| 2008/0080963 A1 | 4/2008 | Bufano et al. |
| 2008/0251717 A1 | 11/2008 | Kortelaninen |
| 2009/0033316 A1 | 2/2009 | Hosek et al. |
| 2009/0074545 A1 | 3/2009 | Lert, Jr. et al. |
| 2009/0085741 A1 | 4/2009 | Ravi et al. |
| 2009/0148259 A1 | 6/2009 | Shani |
| 2009/0224750 A1 | 9/2009 | Hosek et al. |
| 2009/0265031 A1 | 11/2009 | Tachibana et al. |
| 2010/0118149 A1 | 5/2010 | Levin et al. |
| 2010/0121481 A1 | 5/2010 | Talley et al. |
| 2010/0183409 A1 | 7/2010 | Checketts et al. |
| 2010/0185353 A1 | 7/2010 | Barwick et al. |
| 2010/0188210 A1 | 7/2010 | Howard et al. |
| 2010/0241753 A1 | 9/2010 | Garbajs et al. |
| 2010/0295943 A1 | 11/2010 | Cha et al. |
| 2010/0305854 A1 | 12/2010 | Kammel et al. |
| 2010/0316468 A1 | 12/2010 | Lert et al. |
| 2011/0038692 A1 | 2/2011 | Hofmeister et al. |
| 2011/0043373 A1 | 2/2011 | Best et al. |
| 2011/0068943 A1 | 3/2011 | Lane, Jr. |
| 2011/0125323 A1 | 5/2011 | Gutmann et al. |
| 2011/0182703 A1 | 7/2011 | Alan |
| 2011/0202175 A1 | 8/2011 | Romanov et al. |
| 2011/0208350 A1 | 8/2011 | Eliuk et al. |
| 2011/0029579 A1 | 12/2011 | Hardegger et al. |
| 2011/0198579 A1 | 12/2011 | Hardegger et al. |
| 2011/0298579 A1 | 12/2011 | Hardegger et al. |
| 2012/0035750 A1 | 2/2012 | Edel |
| 2012/0083906 A1 | 4/2012 | Weatherhead et al. |
| 2012/0095575 A1 | 4/2012 | Meinherz |
| 2012/0185080 A1 | 7/2012 | Cyrulik et al. |
| 2013/0158708 A1 | 6/2013 | Emmertz et al. |
| 2014/0088758 A1 | 3/2014 | Lert et al. |
| 2014/0301810 A1 | 10/2014 | Steinbach |
| 2014/0343717 A1 | 11/2014 | Dorval et al. |
| 2020/0371514 A1 | 11/2020 | Dorval et al. |
| 2022/0342413 A1 | 10/2022 | Dorval et al. |

FOREIGN PATENT DOCUMENTS

| | | |
|---|---|---|
| JP | 60183405 | 9/1985 |
| JP | 61094905 | 5/1986 |
| JP | 61271505 | 12/1986 |
| JP | 62140902 | 6/1987 |
| JP | 2002167006 | 6/2002 |
| JP | 2004056381 | 2/2004 |
| JP | 2007135347 | 5/2007 |
| JP | 2009271592 | 11/2009 |
| WO | 0055827 | 3/1999 |
| WO | 2005071597 | 1/2005 |
| WO | 2010118412 | 10/2010 |
| WO | 2012083055 | 6/2012 |
| WO | 2013060569 | 5/2013 |

* cited by examiner

MAINTENANCE ACCESS ZONES FOR STORAGE AND RETRIEVAL SYSTEMS

CROSS-REFERENCE TO RELATED APPLICATIONS

This application is a continuation of U.S. Non-Provisional patent application Ser. No. 17/229,596, filed Apr. 13, 2021, (now U.S. Pat. No. 11,629,015), which is a continuation of U.S. Non-Provisional patent application Ser. No. 16/716,130, filed Dec. 16, 2019, (now U.S. Pat. No. 10,974,910), which is a continuation of U.S. Non-Provisional patent application Ser. No. 16/358,506, filed Mar. 19, 2019, (now U.S. Pat. No. 10,507,988), which is a continuation of U.S. Non-Provisional patent application Ser. No. 16/018,313, filed Jun. 26, 2018, (now U.S. Pat. No. 10,233,037), which is a continuation of U.S. Non-Provisional patent application Ser. No. 15/465,347, filed on Mar. 21, 2017, (now U.S. Pat. No. 10,005,624), which is a continuation of U.S. Non-provisional patent application Ser. No. 15/290,764, filed on Oct. 11, 2016, (now U.S. Pat. No. 9,598,237), which is a continuation of U.S. Non-provisional patent application Ser. No. 14/244,394, filed on Apr. 3, 2014, (now U.S. Pat. No. 9,463,925), which is a continuation of U.S. Non-provisional patent application Ser. No. 13/326,565, filed on Dec. 15, 2011, (now U.S. Pat. No. 8,694,152), which is a Non-provisional of and claims the benefit of U.S. Provisional Patent Application No. 61/423,308, filed on Dec. 15, 2010, the disclosures of which are incorporated herein by reference in their entireties.

BACKGROUND

Field

The embodiments generally relate to storage and retrieval systems and, more particularly, to maintenance access for autonomous storage and retrieval systems.

Brief Description of Related Developments

Warehouses for storing case units may generally comprise a series of storage racks that are accessible by transport devices such as, for example, fork lifts, carts and elevators that are movable within aisles between or along the storage racks or by other lifting and transporting devices. These transport devices may be automated or manually driven. Generally, when areas of the storage and retrieval system require maintenance humans and, for example, the transporting devices and other moving structures of the storage and retrieval system have an opportunity to occupy substantially the same space within the storage and retrieval system substantially at the same time.

It would be advantageous to provide maintenance access zones that are capable of isolating areas of the storage and retrieval system when maintenance is performed.

BRIEF DESCRIPTION OF THE DRAWINGS

The foregoing aspects and other features of the disclosed embodiments are explained in the following description, taken in connection with the accompanying drawings, wherein.

DETAILED DESCRIPTION OF THE EXEMPLARY EMBODIMENT(S)

Figure 1:
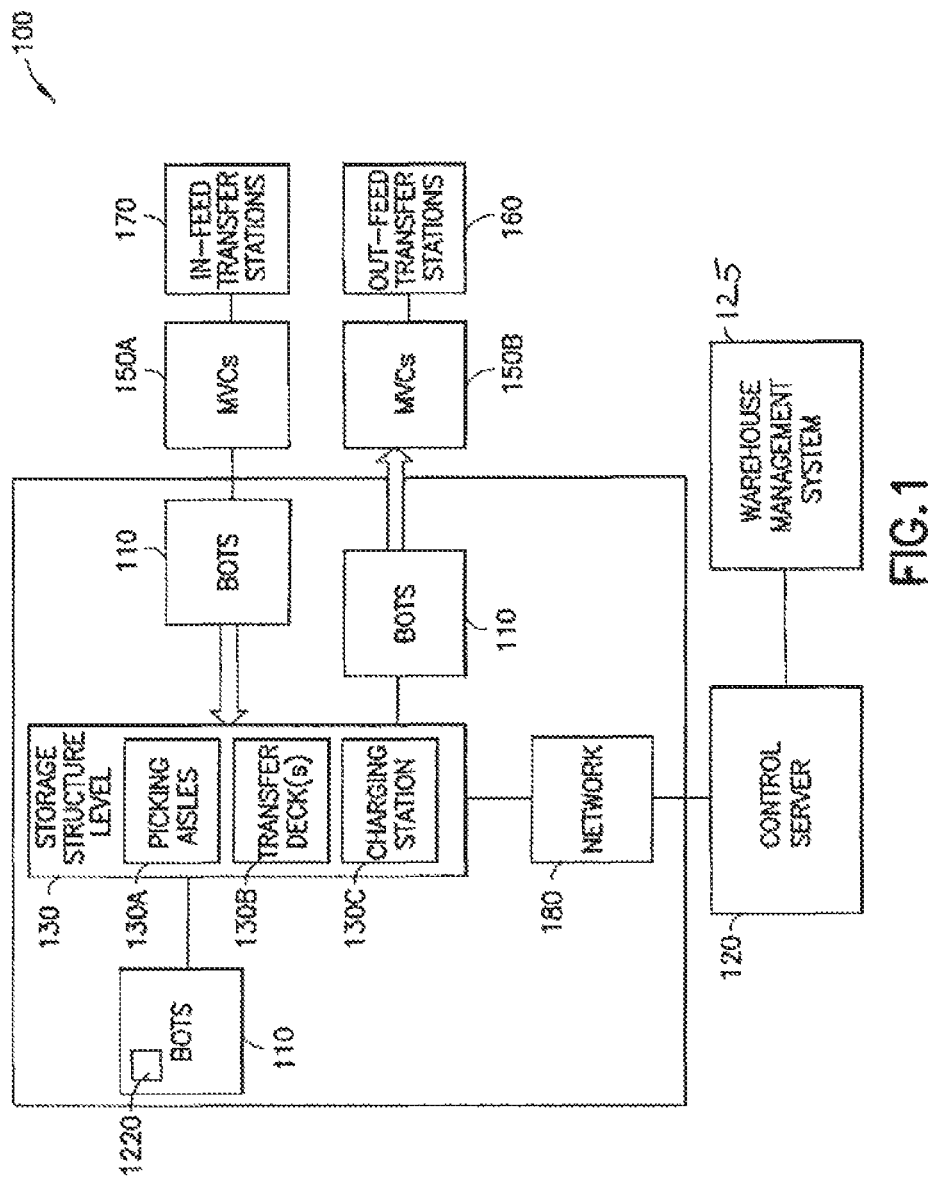
FIG. 1 schematically illustrates an exemplary storage and retrieval system in accordance with the embodiments.

FIG. 1 schematically illustrates an exemplary storage and retrieval system in accordance with the embodiments. Although the disclosed embodiments will be described with reference to the embodiments shown in the drawings, it should be understood that the disclosed embodiments can be embodied in many alternate forms. In addition, any suitable size, shape or type of elements or materials could be used.

In accordance with the embodiments the storage and retrieval system 100 may operate in a retail distribution center or warehouse to, for example, fulfill orders received from retail stores for case units (where case units as used herein means items not stored in trays, on totes or on pallets, e.g. uncontained or items stored in trays, totes or on pallets). It is noted that the case units may include cases of items (e.g. cases of soup cans, boxes of cereal, etc.) or individual items that are adapted to be taken off of or placed on a pallet. In accordance with the exemplary embodiments, shipping cases or case units (e.g. cartons, barrels, boxes, crates, jugs, totes, pallets or any other suitable device for holding case units) may have variable sizes and may be used to hold items in shipping and may be configured so they are capable of being palletized for shipping. It is noted that when, for example, bundles or pallets of case units arrive at the storage and retrieval system the content of each pallet may be uniform (e.g. each pallet holds a predetermined number of the same item—one pallet holds soup and another pallet holds cereal) and as pallets leave the storage and retrieval system the pallets may contain any suitable number and combination of different items (e.g. each pallet may hold different types of items—a pallet holds a combination of soup and cereal). In the embodiments the storage and retrieval system described herein may be applied to any environment in which case units are stored and retrieved.

The storage and retrieval system 100 may be configured for installation in, for example, existing warehouse structures or adapted to new warehouse structures. In the embodiments, the storage and retrieval system may include in-feed and out-feed transfer stations 170, 160, multilevel vertical conveyors 150A, 150B (generally referred to herein as multilevel vertical conveyors 150), a storage structure 130, and a number of autonomous transport vehicles or robots 110 (referred to herein as "bots"). In the embodiments the storage and retrieval system may also include robot or bot transfer stations (as described in, for example, U.S. patent application Ser. No. 12/757,220, entitled "STORAGE AND RETRIEVAL SYSTEM" and filed on Apr. 9, 2010, the disclosure of which is incorporated by reference herein in its entirety) that may provide an indirect interface between the bots 110 and the multilevel vertical conveyor 150A, 150B. The in-feed transfer stations 170 and out-feed transfer stations 160 may operate together with their respective multilevel vertical conveyors 150A, 150B for bi-directionally transferring case units to and from one or more levels of the storage structure 130. It is noted that while the multilevel vertical conveyors are described herein as being dedicated inbound or in-feed conveyors 150A and outbound or out-feed conveyors 150B, in the embodiments each of the conveyors 150A, 150B may be used for both inbound and outbound transfer of case units/items from the storage and retrieval system. The multilevel vertical conveyors may be any suitable lifting devices for transporting case units between levels of the storage and retrieval system. It is noted that while multilevel vertical conveyors are described herein in other aspects the conveyors may be any suitable conveyors or transfer/picking devices having any suitable transport path orientation. Some non-limiting suitable examples of multilevel vertical conveyors can be found in, for example, U.S. Provisional Patent Application entitled "LIFT INTERFACE FOR STORAGE AND RETRIEVAL SYSTEMS" (Ser. No. 61/423,298) and filed on Dec. 15, 2010 (now U.S. patent application Ser. No. 13/327,088 and filed on Dec. 15, 2011), and U.S. patent application Ser. No. 12/757,354, entitled "LIFT INTERFACE FOR STORAGE AND RETRIEVAL SYSTEMS," (the disclosures of which are incorporated by reference herein in their entireties) and U.S. patent application Ser. No. 12/757,220, entitled "STORAGE AND RETRIEVAL SYSTEM," (previously incorporated by reference). For example, the multilevel vertical conveyors may have any suitable number of support shelves for transporting the case units to a predetermined level of the storage and retrieval system. The support shelves may have slatted supports configured to allow fingers of the bots 110 or in-feed/out-feed transfer stations 170, 160 to pass between the slats for transferring case units to and from the conveyor. In the embodiments transfer of case units between the bots and the multilevel vertical conveyors may occur in any suitable manner.

As may be realized, the storage and retrieval system 100 may include multiple in-feed and out-feed multilevel vertical conveyors 150A, 150B that are accessible by, for example, bots 110 on each level of the storage and retrieval system 100 so that one or more case unit(s) can be transferred from a multilevel vertical conveyor 150A, 150B to each storage space on a respective level and from each storage space to any one of the multilevel vertical conveyors 150A, 150B on a respective level. The bots 110 may be configured to transfer the case units between the storage spaces and the multilevel vertical conveyors with one pick (e.g. substantially directly between the storage spaces and the multilevel vertical conveyors). By way of further example, the designated bot 110 picks the case unit(s) from a shelf of a multilevel vertical conveyor, transports the case unit(s) to a predetermined storage area of the storage structure 130 and places the case unit(s) in the predetermined storage area (and vice versa).

The bots 110 may be configured to place case units, such as the above described retail merchandise, into picking stock in the one or more levels of the storage structure 130 and then selectively retrieve ordered items for shipping the ordered items to, for example, a store or other suitable location. In the embodiments, the bots 110 may interface in any suitable manner with the multilevel vertical conveyors 150A, 150B such as through, for example, extension of a transfer arm or effector of the bot (which may have fingers for interfacing with slatted support shelves of the multi-level vertical conveyors) relative to a frame of the bot. Suitable examples of bots are described in U.S. patent application Ser. No. 12/757,312, entitled "AUTONOMOUS TRANSPORTS FOR STORAGE AND RETRIEVAL SYSTEMS" and filed on Apr. 9, 2010, U.S. Provisional Patent Application entitled "BOT PAYLOAD ALIGNMENT AND SENSING" (Ser. No. 61/423,220) and filed on Dec. 15, 2010 (now U.S. patent application Ser. No. 13/327,040 filed on Dec. 15, 2011), U.S. Provisional Patent Application entitled "AUTOMATED BOT WITH TRANSFER ARM" (Ser. No. 61/423,365) and filed on Dec. 15, 2010 (now U.S. patent application Ser. No. 13/326,952 filed on Dec. 15, 2011), U.S. Provisional Patent Application entitled "BOT HAVING HIGH SPEED STABILITY" (Ser. No. 61/423,359) and filed on Dec. 15, 2010 (now U.S. patent application Ser. No. 13/326,447 filed on Dec. 15, 2011), and U.S. Provisional Patent Application entitled "AUTOMATED BOT TRANSFER ARM DRIVE SYSTEM" (Ser. No. 61/423,388) and filed on Dec. 15, 2010 (now U.S. patent application Ser. No. 13/326,993 filed on Dec. 15, 2011), the disclosures of which are incorporated by reference herein in their entireties.

The storage structure 130 may include multiple levels of storage rack modules where each level includes an array of storage spaces (arrayed on the multiple levels and in multiple rows on each level), picking aisles 130A formed between the rows of storage spaces, and transfer decks 130B. In the embodiments, each level may also include respective bot transfer stations that provide an indirect interface between the bots and the multilevel vertical conveyors. In this exemplary embodiment, the picking aisles 130A and transfer decks 130B may be arranged for allowing the bots 110 to traverse respective levels of the storage structure 130 for placing case units into picking stock and to retrieve the ordered case units. As may be realized, the storage and retrieval system may be configured to allow random accessibility to the storage spaces. For example, all storage spaces in the storage structure 130 may be treated substantially equally when determining which storage spaces are to be used when picking and placing case units from/to the storage structure 130 such that any storage space of sufficient size can be used to store items. The storage structure 130 of the embodiments may also be arranged such that there is no vertical or horizontal array partitioning of the storage structure. For example, each multilevel vertical conveyor 150A, 150B is common to all storage spaces (e.g. the array of storage spaces) in the storage structure 130 such that any bot 110 can access each storage space and any multilevel vertical conveyor 150A, 150B can receive case units from any storage space on any level so that the multiple levels in the array of storage spaces substantially act as a single level (e.g. no vertical partitioning). The multilevel vertical conveyors 150A, 150B can also receive case units from any storage space on any level of the storage structure 130 (e.g. no horizontal partitioning). In the embodiments the storage and retrieval system may be configured so that each multilevel vertical conveyor serves a predetermined area of the array of storage spaces.

Figure 11A:
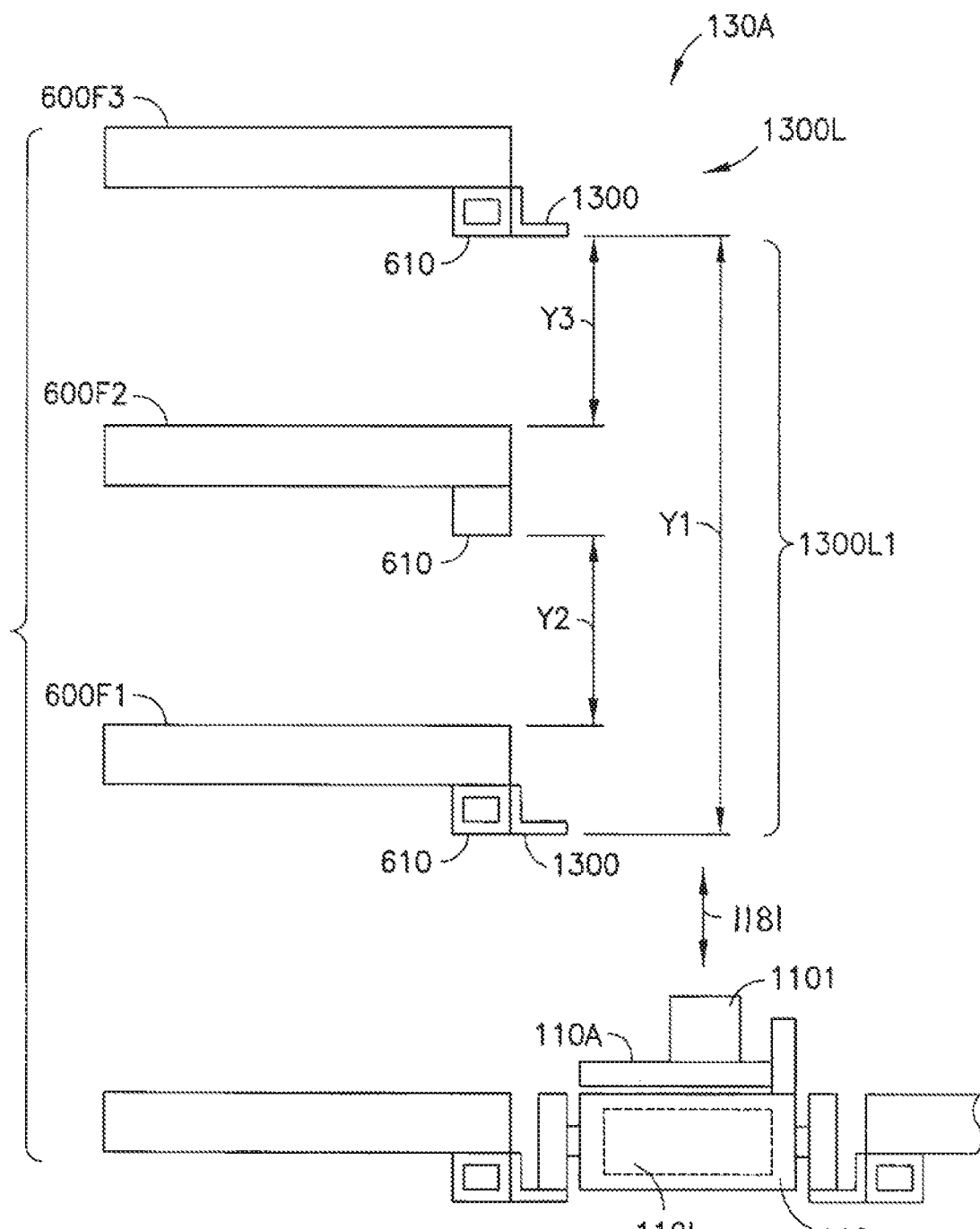
FIG. 11A is a schematic illustration of another exemplary storage structure in accordance with the embodiments.
Figure 12:
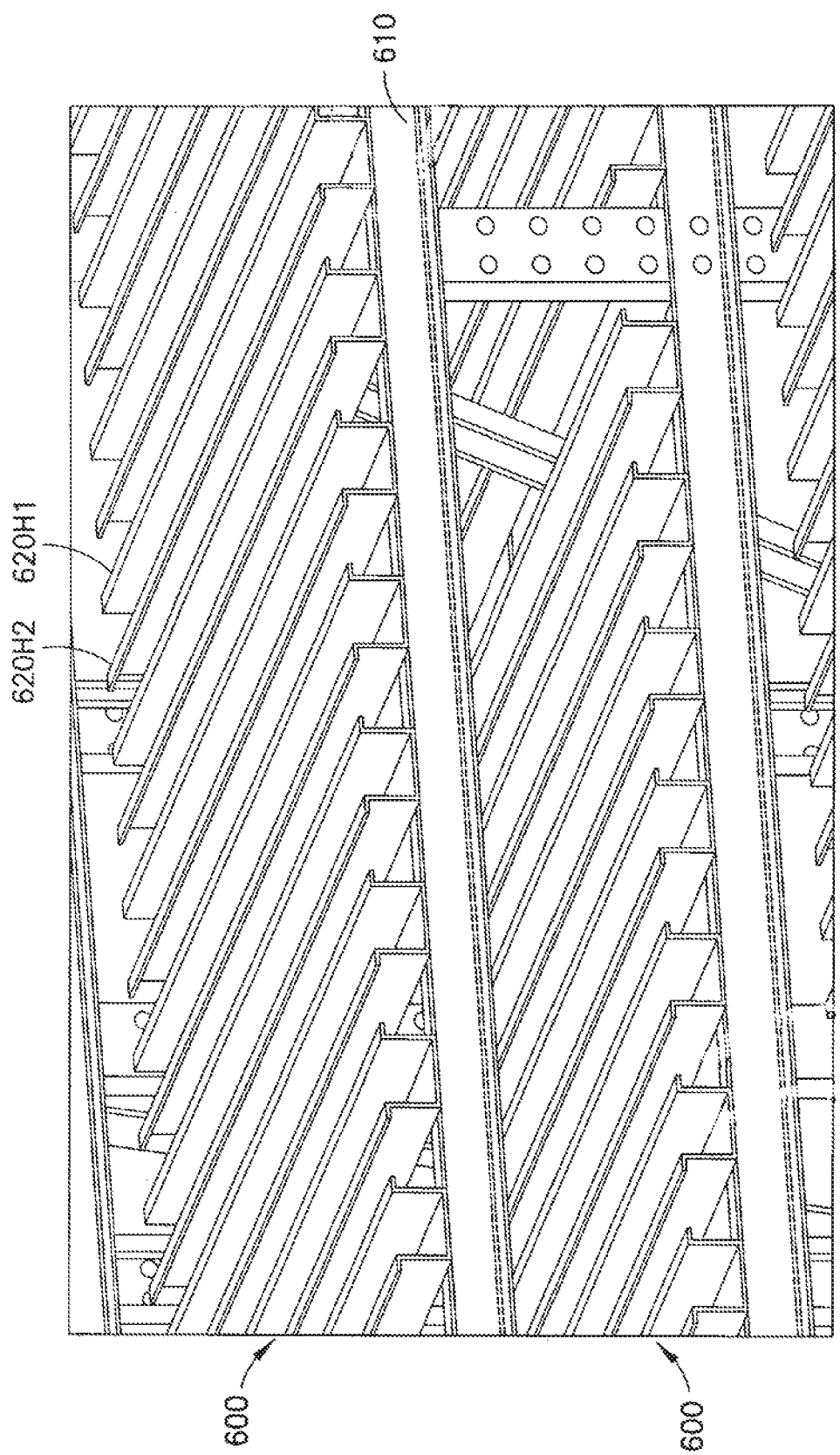
FIG. 12 is a schematic illustration of a portion of the storage and retrieval system of FIG. 1.

Referring to FIG. 11A, in another aspect the storage structure may be configured such that one or more levels of storage shelves are accessed by but one level of the storage aisle. For example, as described above, each storage aisle includes pairs of tracks 1300 disposed on both sides of the storage aisle for the bot 110 to travel on. The pairs of tracks are arranged in a vertical stack such that one pair of tracks 1300 (e.g. a storage aisle level 1300L) provides bot 110 access to one or more of the vertically stacked storage shelves 600 (e.g. one storage aisle level is common to multiple storage rack levels). In one aspect each storage aisle level 1300L may provide bot 110 access to but one level of storage shelves 600 while in other aspects each storage aisle level 1300L1 may provide bot 110 access to more than one level of storage shelves 600. In still other aspects some storage aisle levels (or a portion thereof) may provide access to one level of storage shelves while other storage aisle levels (or a portion thereof, e.g., in the same or a different storage aisle of the storage structure) may provide access to more than one level of storage shelves 600. The storage aisle levels 1300L may be vertically spaced apart (e.g. the vertical distance between the pairs of tracks 1300) by any suitable distance Y1 to allow for the location of at least one storage level between the storage aisle levels 1300L. For exemplary purposes only the distance Y1 may be, for example, about twenty-four inches while in other examples the distance Y1 may be more or less than about twenty-four inches. The distance Y2, Y3 between each storage shelf 600 may be any suitable distance to allow for case units of any suitable size to be placed on the respective storage shelves 600. For exemplary purposes only, the vertical distance Y2 between storage shelves 600F1 and 600F2 may be sufficient for placement of a case unit having a height of about five inches (or any other suitable height) while in other examples the distance Y2 may be any suitable distance for allowing placement of a case unit having a height of more or less than about five inches (or any other suitable height). Also for exemplary purposes only, the vertical distance Y3 between storage shelves 600F2 and 600F3 may sufficient for placement of a case unit having a height of about nine inches while in other examples the distance Y3 may be any suitable distance for allowing placement of a case unit having a height of more or less than about nine inches. While the distances Y2 and Y3 are described above as being different from each other so that the respective storage shelves can accommodate case units of differing heights, in other aspects the distances Y2, Y3 between storage shelves 600 may be substantially the same. As an example, a first or base level shelf 600F1 may be provided closest to the tracks 1300 (or transfer deck/aisle structure) where the bot arm 110A may effect picking/placing of case units 1101 on the base level shelf 600F1 with substantially little or no lift. The base level shelf 600F1 may extend a length of the whole picking aisle 130A or part of the length of the picking aisle 130A. One or more upper pick level shelves 600F2, 600F3 may be provided over the base level shelf 600F1 for at least part of the length of the aisle (in one aspect one or more of the upper pick level shelves 600F2, 600F3 may extend substantially the whole length of the picking aisle 130A where desired). The depth of the storage levels 600F1-600F3 may be sufficient for the picking/placing of case units 1101 with the bot arm 110A extension/reach. It is noted that the height of the upper pick levels 600F2, 600F may be varied along the length of the picking aisle 130A (e.g. shelf height may be commensurate with storage distribution). For example, in some portions of the picking aisle 130A one or more of the upper level storage shelves 600F2, 600F3 may be closer to the base shelf 600F1 (e.g. to allow placement of taller case units on the upper shelves), while along other portions of the of the picking aisle 130A one or more of the upper level shelves 600F2, 600F3 may be further away from the base shelf 600F1 to allow taller cases to be placed on the lower shelves. In other aspects other portions of the picking aisle may have the base level shelf 600F1 without any of the upper level storage shelves 600F2, 600F3. The multiple storage levels per picking aisle track 1300 may exploit the storage volume over the base storage level 600F1 to provide increased rack storage case density per length of rack. The upper rack levels 600F2, 600F3 may be substantially similar to the base level rack 600F1 and have, for example, unconstrained case unit support for dynamic positioning of the case units. The incremented hat seating surface, of the upper storage levels 600F2, 600F3, formed by the inverted hat 620H1, 620H2 storage structure, similar to that of the base level 600F1 (see FIG. 12) is positioned such as by reference to a datum, to allow bot positioning for the base and upper levels 600F1-600F3 with a common bot positioning system in the picking aisles 130A (e.g. the same positioning system is used by the bot for the base and upper storage levels 600F1-600F3). In one aspect one or more of the bot 110 and storage rack levels 600F1-600F3 may include suitable sensors or other flagging devices to confirm a case height for either the base storage level 600F1 or one of the upper storage levels 600F2, 600F3 to confirm the case units 1101 height with a height of the storage rack 600F1-600F3 and bot lift for unhindered picking and placing of the case unit 1101 on the desired storage rack level 600F1-600F3.

Figure 11B:
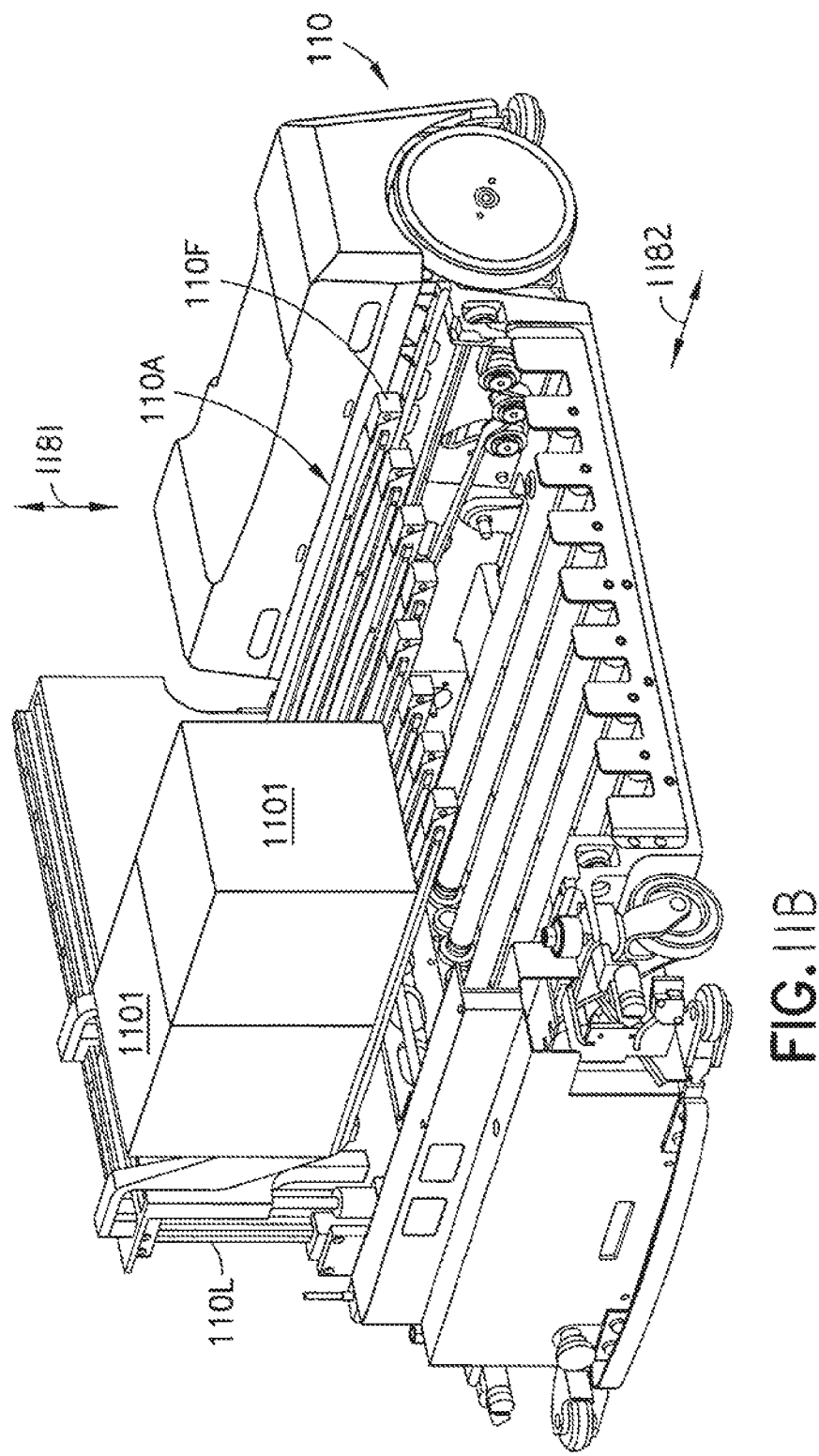
FIG. 11B is a schematic illustration of an autonomous transport in accordance with the embodiments.

Referring also to FIG. 11B, where one or more of the storage aisle levels 1300L provides bot access to at least one level of storage shelves 600 the bot 110 may be configured to transport case units 1101 from the storage aisle level to any one of the storage shelf levels served by that storage aisle level 1300L. For example, in one aspect the bot may have a lift unit 110L configured to raise and lower a transfer arm 110A of the bot 110 in the direction of arrow 1181 so that predetermined fingers 110F of the transfer arm 110A may be extended/retracted in the direction of arrow 1182 for transferring the case units 1101 between the bot 110 and the respective storage shelf levels. The lift unit 110L may be any suitable drive configured to raise and lower the transfer arm 110A such as, for example, a hydraulic lift, a ball screw mechanism, any suitable linear actuator, a rail system, chain and sprocket system, belt and pulley system or any other suitable drive system. The transfer arm 110A includes fingers 110F for supporting one or more case units 1101 during transfer of the case units between the bot 110 and a storage shelf 600. In one aspect, the lift unit 110L may be configured to lift the transfer arm as a unit while still allowing the fingers 110F to be vertically movable relative to a frame of the transfer arm 110 and extendible in the direction of arrow 682 using a common drive axis as described in, for example, U.S. patent application Ser. No. 13/326,952 which is non-provisional of U.S. Ser. No. 61/423,365 filed on Dec. 15, 2010) entitled "Automated Bot with Transfer Arm" filed on Dec. 15, 2011, and U.S. patent application Ser. No. 13/327,040 which is non-provisional of U.S. Ser. No. 61/423,220 filed on Dec. 15, 2010) entitled "Bot Payload Alignment and Sensing" filed on Dec. 15, 2011 incorporated herein by reference.

The storage structure 130 may also include charging stations 130C for replenishing, for example, a battery pack of the bots 110. In the embodiments, the charging stations 130C may be located at, for example, transfer areas 295, 895 (FIGS. 2, 3 and 8) of the transfer deck 130B so that the bots 110 can substantially simultaneously transfer items, for example, to and from a multilevel vertical conveyor 150A, 150B while being charged. The bots 110 and other suitable features of the storage and retrieval system 100 may be controlled by any suitable controller such as, for example, one or more central system control computers (e.g. control server) 120 through, for example, any suitable network 180. The network 180 may be a wired network, a wireless network or a combination of a wireless and wired network using any suitable type and/or number of communication protocols. It is noted that, in the embodiments, the system control server 120 may be configured to manage and coordinate the overall operation of the storage and retrieval system 100 and interface with, for example, a warehouse management system 125, which in turn manages the warehouse facility as a whole. The control server 120 may be substantially similar to that described in, for example, U.S. patent application Ser. No. 12/757,337, entitled "CONTROL SYSTEM FOR STORAGE AND RETRIEVAL SYSTEMS" and filed on Apr. 9, 2010 (the disclosure of which is incorporated by reference herein in its entirety).

Figure 2:
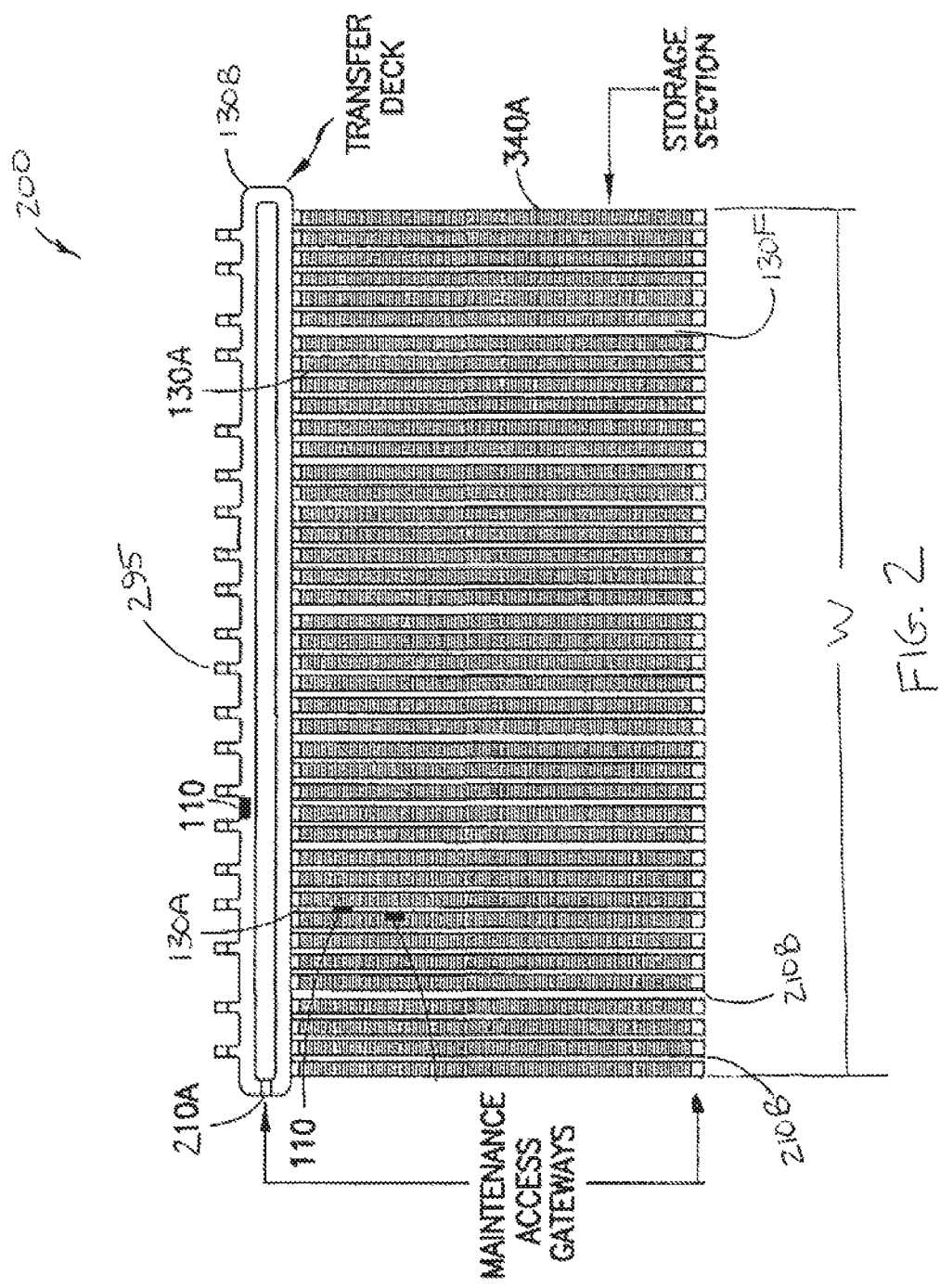
FIG. 2 illustrates a schematic plan view of an exemplary storage and retrieval system in accordance with the embodiments.

Referring also to FIG. 2, an exemplary configuration of the storage and retrieval system 100 is shown. Other suitable exemplary configurations of storage and retrieval systems can be found in, for example, U.S. Provisional Patent Application entitled "Warehousing Scalable Storage Structure" (Ser. No. 61/423,340) and filed on Dec. 15, 2010 (now U.S. patent application Ser. No. 13/326,674 filed on Dec. 15, 2011), and U.S. patent application Ser. No. 12/757,381, entitled "STORAGE AND RETRIEVAL SYSTEM" and filed on Apr. 9, 2010, the disclosures of which are incorporated by reference herein in their entireties. It should be understood that in alternate embodiments the storage and retrieval system may have any suitable configuration. As can be seen in FIG. 2, the storage and retrieval system 200 is configured, for exemplary purposes only, as a single-ended picking structure in which only one side of the system 200 has a transfer section or deck 130B. The single-ended picking structure may be used in, for example, a building or other structure having loading docks disposed only on one side of the building. In this example, the storage and retrieval system 200 includes transfer deck(s) 130B and picking aisles 130A that allow bots 110 to traverse an entirety of a level of the storage structure 130 on which that bot 110 is located for transporting items between any suitable storage locations/picking aisles 130A and any suitable multilevel vertical conveyors 150A, 150B (FIG. 1).

The storage and retrieval system 200 may include maintenance access gateways 210A, 210B that allow, for example, maintenance personnel (e.g. human access) to enter the storage and retrieval system 200 for accessing any suitable structure or component(s) of the storage and retrieval system. In this example a maintenance access gateway 210A is provided on one end of the transfer deck. Another maintenance access gateway may be provided at the ends of the picking aisles 130A opposite the transfer deck 130B. In the embodiments maintenance access gateways may be provided for each level of the storage and retrieval system and/or a single maintenance access gateway may serve multiple levels of the storage and retrieval system. It should also be understood that while only maintenance access gateways 210A, 210B are shown, the storage and retrieval system may have any suitable number of maintenance access gateways located at any suitable locations of the storage and retrieval system. The maintenance access gateways may provide access to one or more maintenance access zones each of which is capable of being "locked out" (e.g. moving storage and retrieval components within the zone are stopped and/or removed from the zone as will be described in greater detail below) when maintenance personnel are within the maintenance access zone. In this example, each of the picking aisles may be defined as an individual maintenance access zone and the transfer deck may be defined as another maintenance access zone. Each of the "aisle maintenance access zones" may be accessible through a respective one of the gateways 210B that, in this example, are arranged transverse to the aisles at a back of the storage and retrieval system. The "transfer deck maintenance access zone" may be accessible through, for example, the gateway 210A located at any suitable location of the transfer deck 130B. As may be realized, in alternate embodiments each of the aisles and transfer deck may be divided into one or more maintenance access zones that are capable of being individually locked out so that at least part of the transfer deck and/or picking aisle is operational (e.g. for storing and retrieving cases) while a maintenance access zone is locked out.

Figure 3:
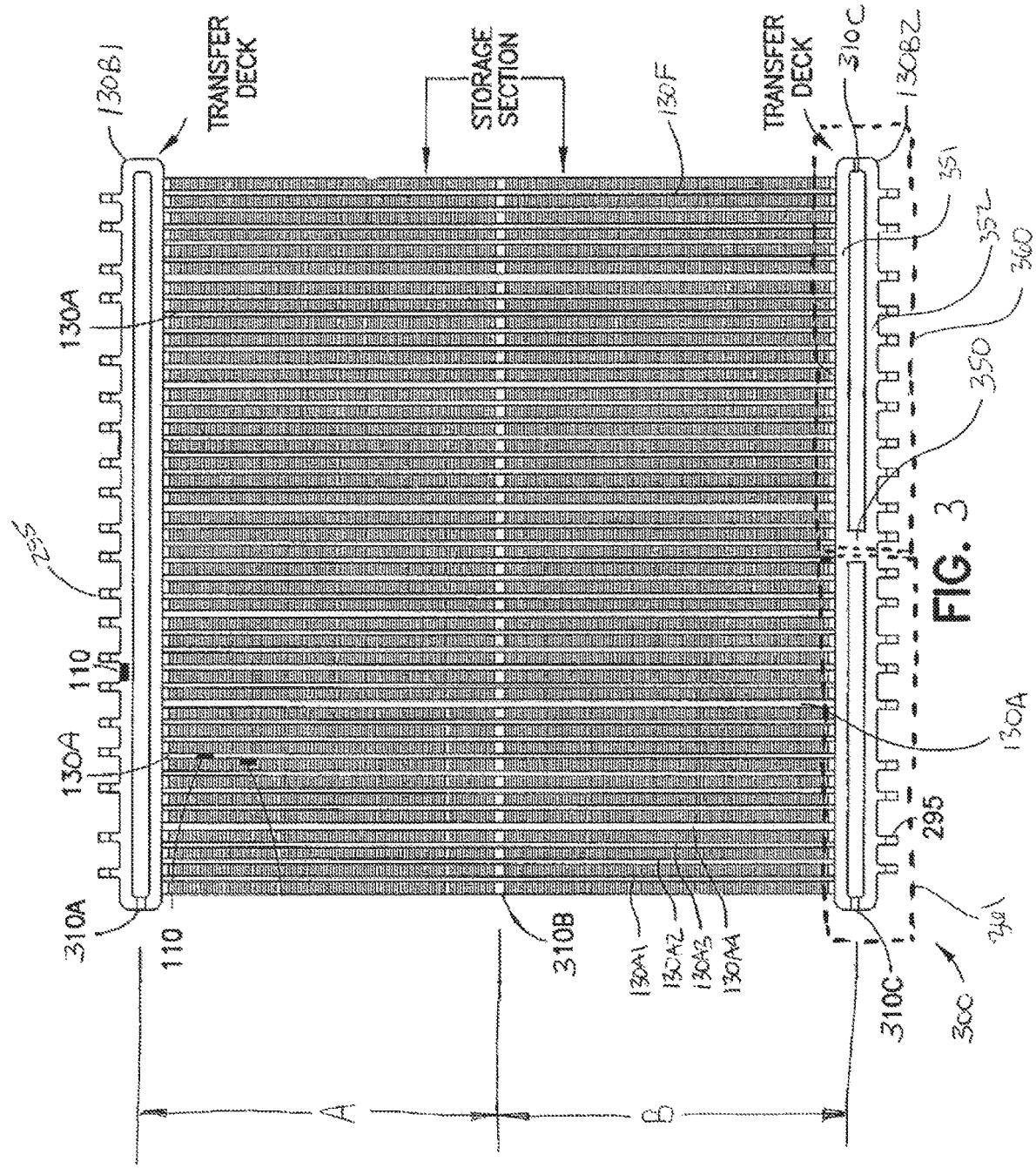
FIG. 3 illustrates a schematic plan view of another exemplary storage and retrieval system in accordance with the embodiments.

Referring to FIG. 3, another exemplary storage and retrieval system 300 is shown. The storage and retrieval system 300 may be substantially similar to storage and retrieval system 100 except as otherwise noted. In this example, the storage and retrieval system is illustrated as having a double-ended picking structure in which both sides of the system 300 have a transfer section or deck 130B1, 130B2. The double-ended picking structure may be used in, for example, a building or other structure having loading docks disposed on substantially opposite sides of the building. In this example, the storage and retrieval system 300 includes transfer decks 130B1, 130B2 and picking aisles 130A. A maintenance access gateway 310A is disposed to provide access to transfer deck 130B1. Maintenance access gateway 310B is disposed, for exemplary purposes only, substantially midway between transfer decks for providing access to the picking aisles. In this example, the maintenance access gateway 310B may be common to all picking aisles 130A but in alternate embodiments one or more of the picking aisles may have its/their own maintenance access gateway separate from the maintenance access gateway(s) of other picking aisles. In this example, each picking aisle 130A may be divided into two maintenance access zones (e.g. one zone is on side A of the storage structure and one zone is on side B of the storage structure) each of which are accessible through the maintenance access gateway 310B. It should be understood that in the embodiments, any suitable number of maintenance access gateways may be provided at any suitable number of locations along the length of the picking aisles between the transfer decks 130B1, 130B2 for providing any suitable number of access zones within the picking aisles (e.g. aisle access zones). Also in the embodiments, two maintenance access gateways 310C, 310D may be provided on opposite ends of the transfer deck 130B2. The transfer deck may also include a shunt 350 that allows bots to traverse between travel lanes 351, 352 of the transfer deck 130B2 without travelling the entire length of the transfer deck 130B2. The transfer deck 130B2 may be divided into two maintenance access zones 360, 361 so that one portion of the transfer deck 130B2 may remain operational (e.g. for storing and retrieving cases) while the other portion of the transfer deck 130B2 is locked out. As may be realized a boundary of the maintenance access zones 360, 361 may be located substantially at the shunt 350 so that the bots 110 travelling on the transfer deck 130B2 are able to travel in a loop around the operational portion of the transfer deck while the other portion of the transfer deck is locked out. In the embodiments, the transfer deck 130B2 may have any suitable number of shunts for forming any suitable number of maintenance access zones each of which are accessible through a respective maintenance access gateway or a common maintenance access gateway.

As described above, referring to FIGS. 4 and 5, the storage and retrieval systems of the embodiments include vertically stacked storage levels, each of which include a respective transfer deck 130B (FIG. 1) and picking aisle 130A (FIG. 1). In the embodiments, one transfer deck may also serve more than one level of picking aisles (e.g. storage levels) such as through ramps or lifts configured to allow the bots 110 to travel between the transfer deck and the more than one storage level. The storage structure 130 may include any suitable number of storage modules 501, 502, 503 each having any suitable number of storage bays 510, 511. Each of the storage bays 510, 511 may hold the picking stock on storage shelves 600 that are separated by the picking aisles 130A. In the embodiments the storage bays 510, 511 and storage shelves 600 may be substantially similar to those described in, for example, U.S. patent application Ser. No. 12/757,220, entitled "STORAGE AND RETRIEVAL SYSTEM," and U.S. patent application Ser. No. 12/757,381, entitled "STORAGE AND RETRIEVAL SYSTEM" (both of which being previously incorporated by reference).

Figure 4:
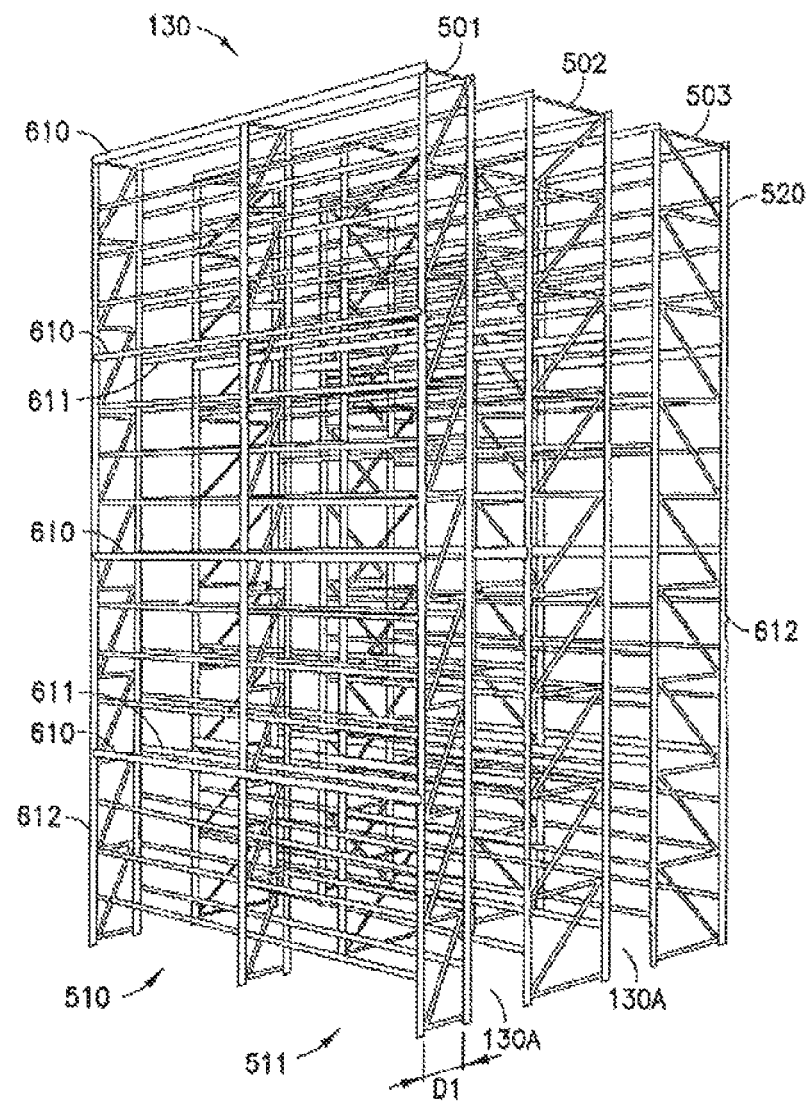
FIG. 4 illustrates a structural portion of a storage and retrieval system in accordance with the embodiments.

It is noted that in one exemplary embodiment the storage modules 501, 502, 503 may include vertical supports 612 and horizontal supports 610, 611, 613 that are joined to form the storage bays 510, 511. In the embodiments one or more of the vertical supports 612 and horizontal supports 610, 611, 613 may be configured to allow for adjusting the height or elevation of the storage shelves 600 and/or aisle floors 130F (FIGS. 2, 3 and 6) relative to, for example, each other and a floor of the facility in which the storage and retrieval system is located. In the embodiments, one or more of the storage shelves and floors may be fixed in elevation. As can be seen in FIG. 4, storage module 501 is configured as an end module having, for example, about half the width of the other storage modules 502, 503. As an example, the end module 501 may have a wall located on one side and the picking aisle 130A located on the opposite side. The depth Dl of end module 501 may be such that access to the storage shelves 600 on module 501 is achieved by the picking aisle 130A located on but one side of the storage module 501, whereas the storage shelves 600 of modules 502, 503 may be accessed by picking aisles 130A located on both sides of the modules 502, 503 allowing for, as an example, the storage modules 502, 503 having a depth substantially twice that of the depth Dl of storage module 501.

Figure 5:
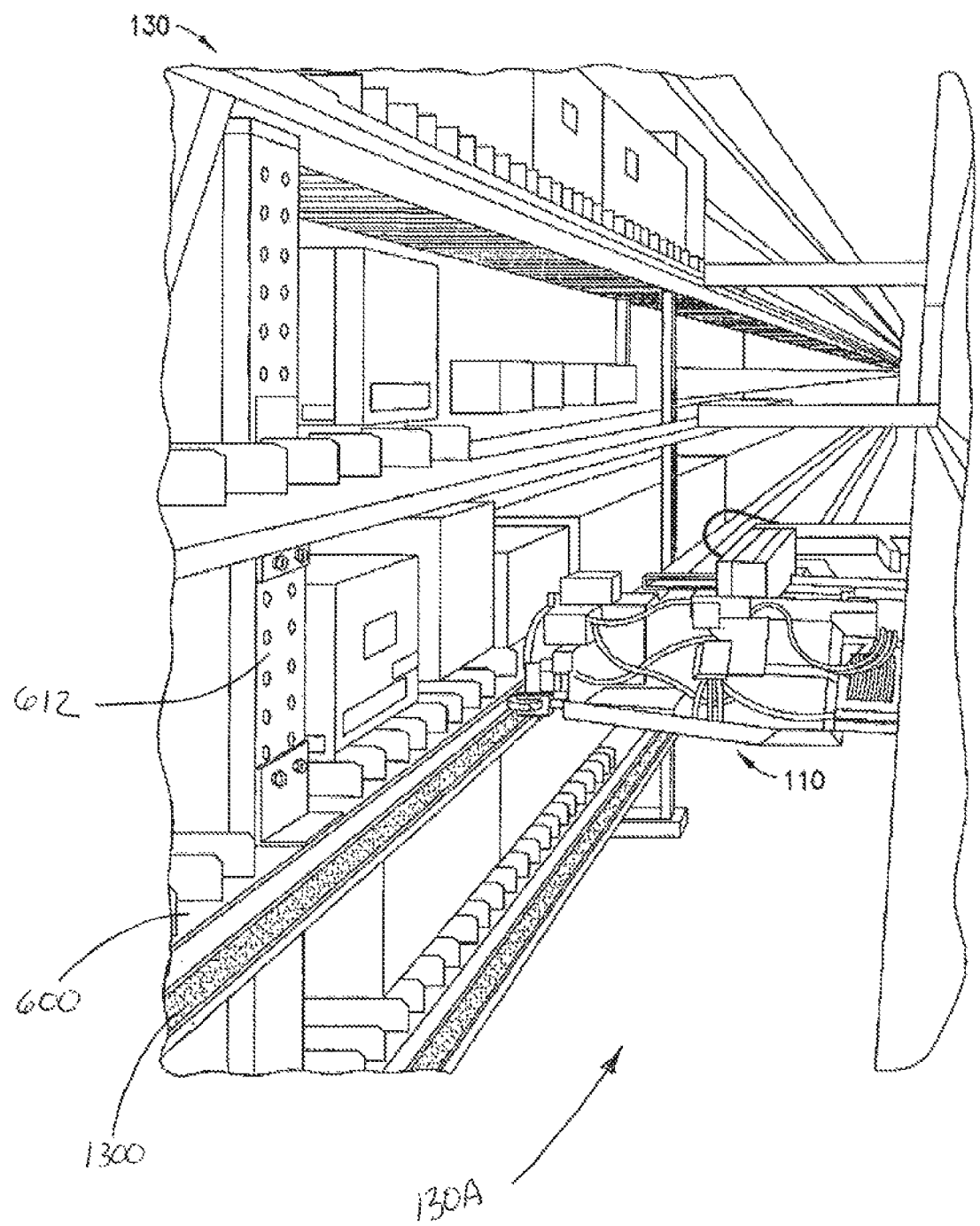
FIG. 5 is a schematic illustration of an autonomous transport vehicle and a portion of a storage shelf in accordance with the embodiments.
Figure 6:
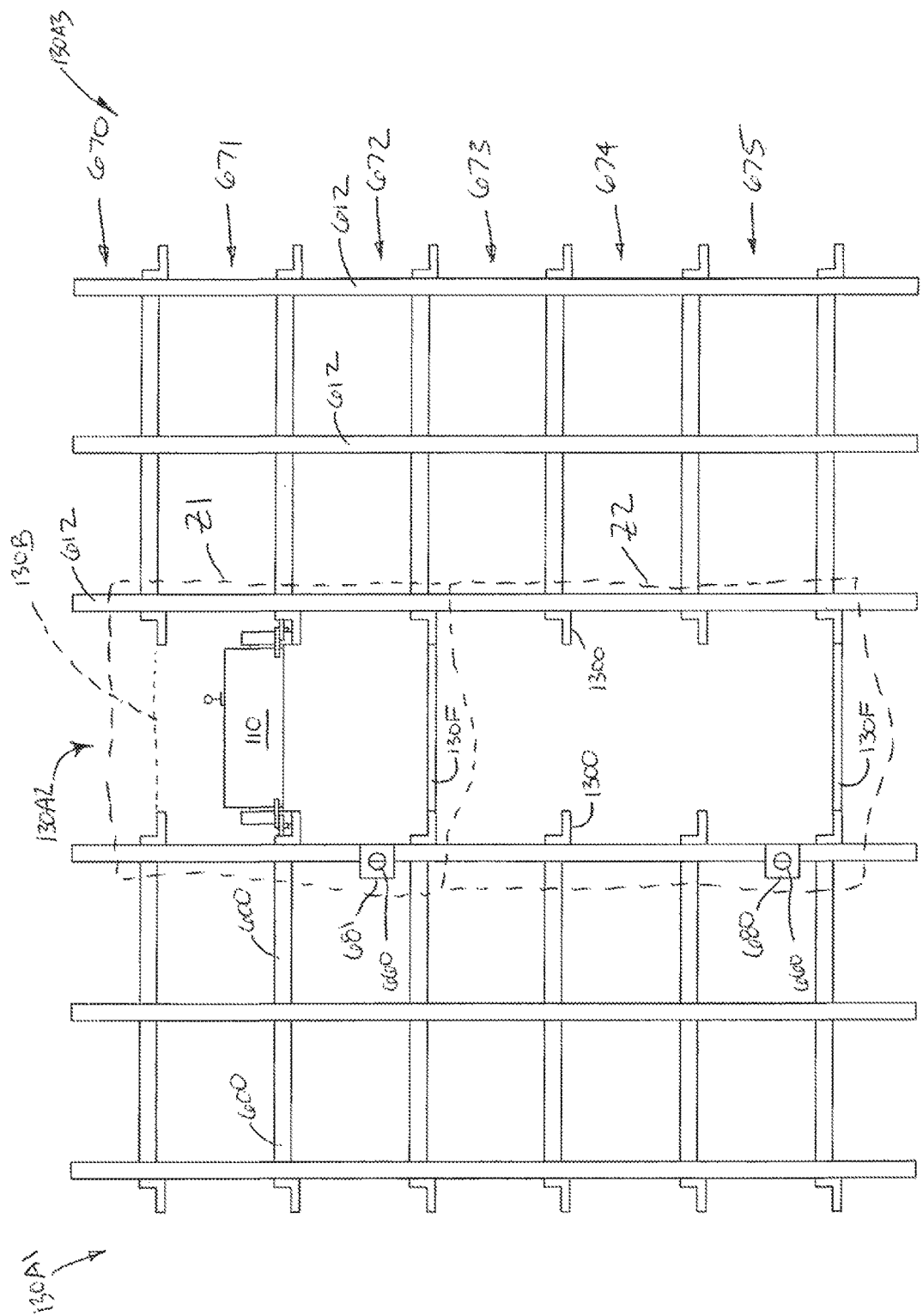
FIGS. 6 and 7 are schematic illustrations of a portion of the storage and retrieval system in accordance with the embodiments.

In the embodiments, as can be seen in, for example, FIGS. 5 and 6, tracks 1300 may be fixed to one or more of the vertical and horizontal supports 612, 610, 611, 613 of the storage structure in any suitable manner such that the bot straddles adjacent tracks 1300 for traversing a picking aisle 130A. As can be seen in FIGS. 5 and 6 one or more levels 670-675 of the picking aisles 130A may be substantially vertically unobstructed by floors 130F (e.g. one or more of the picking aisles do not have floors). The absence of floors 130F on each picking level 670-675 may allow maintenance personnel to walk or otherwise travel down the picking aisles where the height between each storage level would otherwise substantially prevent the maintenance personnel from traversing the picking aisles 130A. In the embodiments, any suitable carts or dollies may be provided (in lieu of or in addition to the floors) where the carts or dollies straddle the adjacent tracks in a manner substantially similar to that described above with respect to the bots 110 or ride along the floors 130F so that the maintenance personnel may ride on the carts or dollies for traversing the picking aisles.

As can be seen in FIG. 6, for exemplary purposes only, an end view of several picking aisles 130A1-130A3 each having multiple levels 670-675 is shown (e.g. looking down the aisles towards the transfer deck). In this example, levels 672 and 675 include aisle floors 130F for providing maintenance access to one or more levels of the picking aisle 130A2. The aisle floor 130F on level 675 may provide access to, for example, storage levels 673-675 (e.g. maintenance access zone Z1) and the aisle floor 130F on level 672 may provide access to, for example, storage levels 670-672 (e.g. maintenance access zone Z2). It should be understood that the levels on which the aisle floors 130F are located are exemplary only and that in alternate embodiments any suitable number of floors may be provided at any number of storage levels for providing maintenance access within the picking aisles. It should also be understood that the storage levels 670-675 may be grouped together or not grouped together in any suitable manner for forming one or more maintenance access zones.

Access to each level 672, 675 having an aisle floor 130F may be provided in any suitable manner using any suitable access device 810 (FIG. 8) of a corresponding maintenance access gateway (210B, FIGS. 2 and 310B, FIG. 3). In one example where the storage structure is a single-ended structure the access device 810 may be one or more platforms, ladders, elevators or other lifting devices located at an end of a respective aisle at for example, maintenance access gateway 210B. In another example where the storage structure is a double-ended structure, in addition to or in lieu of having access located at the ends of the structure as described above with respect to the single-ended structure, the access device 810 may be located between transfer decks 130B adjacent a respective aisle at for example, maintenance access gateway 310B or at any other suitable location of the storage and retrieval system. The access device 810 of the maintenance access gateway 210B, 310B may be a rack or platform structure extending, for example, the entire width W (e.g. transverse to a length of the picking aisles) or a portion of the width W of the storage structure where the rack structure includes, for example, a floor corresponding to each of the aisle floors 130F and one or more flights of stairs, ladders, or other structure allowing maintenance personnel to traverse between the floors of the rack structure. It is noted that in the embodiments any suitable device or structure may be used to provide maintenance personnel access to the aisle floors 130F.

Figure 7:
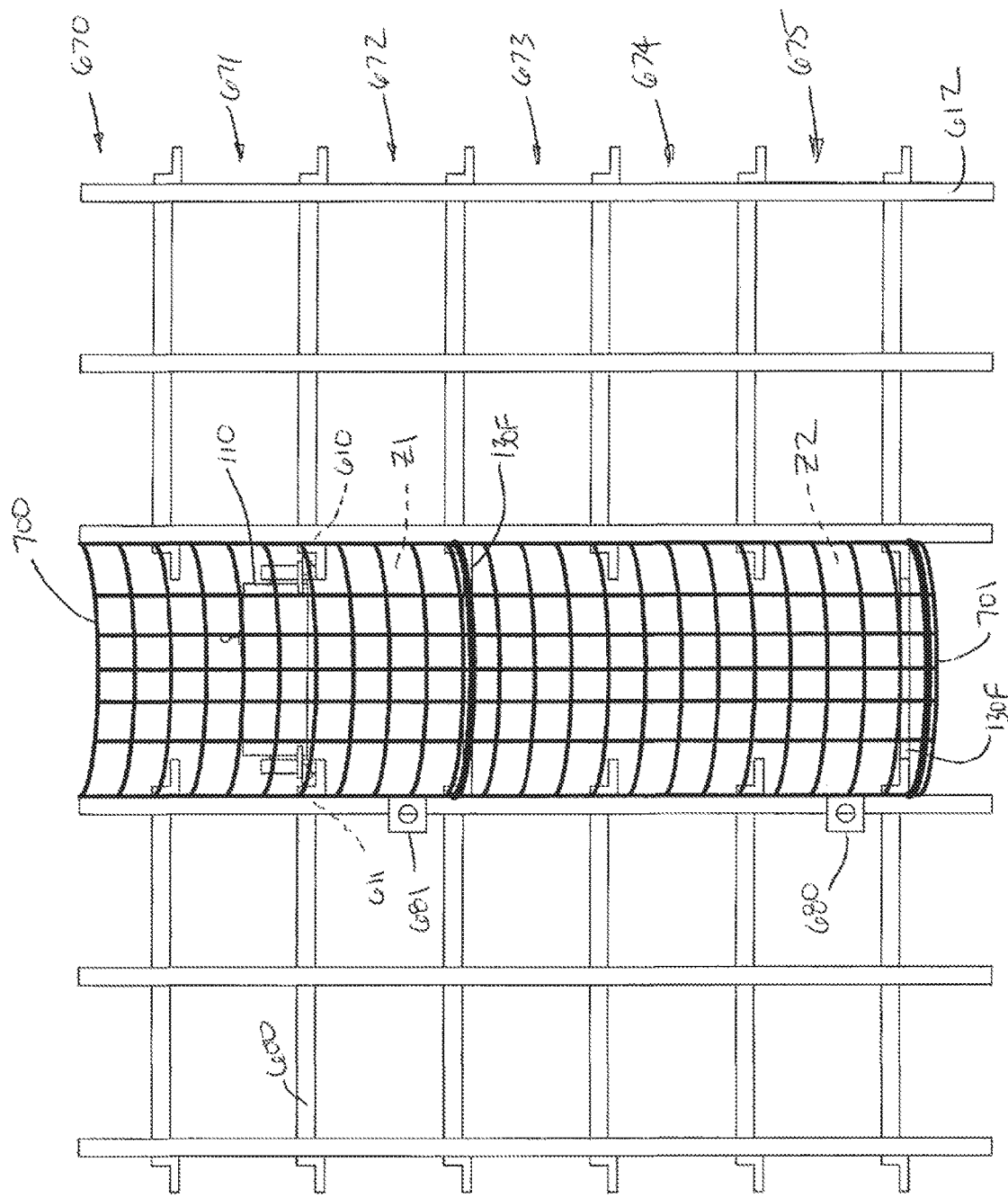

Referring to FIG. 7 one or more suitable barriers 700, 701 may be provided at, for example, the end of the picking aisle 130 opposite the transfer deck (where the storage structure is a single-ended structure) and/or substantially within or adjacent the maintenance access gateway 310B (where the storage structure is a double-ended structure) to substantially prevent, for example, a bot 110 from exiting a picking aisle and entering, for example, the maintenance access gateway (210B, 310B, FIGS. 2 and 3). As may be realized, the barriers placed at the ends of the picking aisles (e.g. opposite the transfer deck) in, for example, the single-ended picking structure may also substantially prevent moving bots 110 from exiting the picking aisles during operation of the storage and retrieval system 100 regardless of whether or not there is a maintenance access gateway located at the end of the picking aisle. As may be realized, the barriers in maintenance access gateway 310B of the double-ended picking structure may be removed from, for example, at least the picking aisles 130A that are not locked out to allow bots 110 full access to the both sides A, B of the picking aisles 130A when the storage and retrieval system is operational for storing and retrieving cases.

The one or more barriers 700, 701 may be in the form of one or more nets but the barriers may also be in the form of bars (substantially similar to those described below), screens (substantially similar to the nets but having a more substantially rigid framed structure), or any other suitable barrier for substantially preventing the passage of bots 110 through the barrier. In one example, a barrier 700, 701 may be provided for each group of storage levels 670-675 served by a respective aisle floor 130F. For example, a barrier 700 may be provided for maintenance access zone Z1 and barrier 701 may be provided for maintenance access zone Z2. The barriers 700, 701 may be removably or movably attached to, for example, one or more of the vertical or horizontal members 610-612 of the storage structure so that the barrier may be at least partially removed or opened to allow maintenance personnel to enter, for example, the picking aisle 130A2. For example, where the barrier 700, 701 is in the form of a net, the net may be fastened to the vertical and/or horizontal members 610-612 using clips, or other removable fasteners so that at least a portion of the net may be moved away from the storage structure allowing access into the picking aisle 130A2. Where the barrier 700, 701 is in the form of bars or screens a hinged or other moveable connection may be used so that the bars or screens function substantially as doors or gates to allow access into the picking aisles 130A. The barriers 700, 701 may be configured to allow access into the picking aisles in any suitable manner.

It is noted that where the barriers 700, 701 are used in a double-ended storage structure, such as within maintenance access gateway 310B (FIG. 3) the barriers 700, 701 may be provided for one or more levels of picking aisles only when those picking aisles are locked out (e.g. the barrier is not present during operation of the associated picking aisle levels when those picking aisle levels are operational for storing and retrieving cases). In one example, referring briefly to FIG. 3, if maintenance personnel were accessing picking aisle 130A4 from the left of the storage and retrieval system 300 through maintenance access gateway 310B the movable barriers may be automatically positioned, e.g. upon a locking out of the desired level(s) of picking aisle 130A4, to block one or more sides of the maintenance access gateway for the desired storage level(s) (e.g. a barrier would be placed in any picking aisle 130A1-130A4 through which the maintenance personnel would travel to reach the locked out aisle). The maintenance access gateway 310B may be configured in any suitable manner to provide access to any desired storage levels of any desired aisle without blocking other picking aisles. The barriers may also be moved into position to block the desired levels of one or more picking aisles in any suitable manner.

Figure 8:
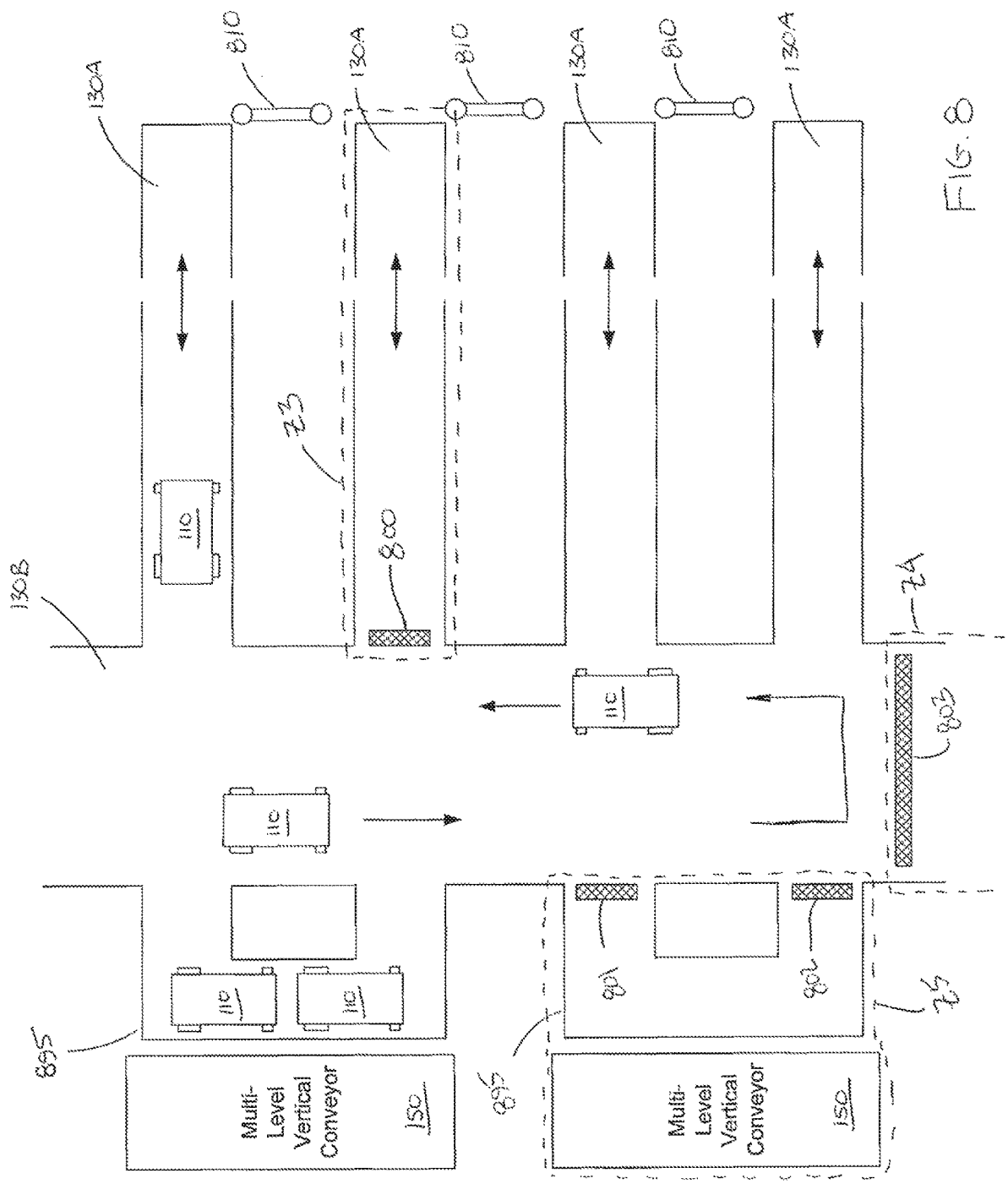
FIG. 8 is a schematic illustration of a portion of the storage and retrieval system in accordance with the embodiments.
Figure 9:
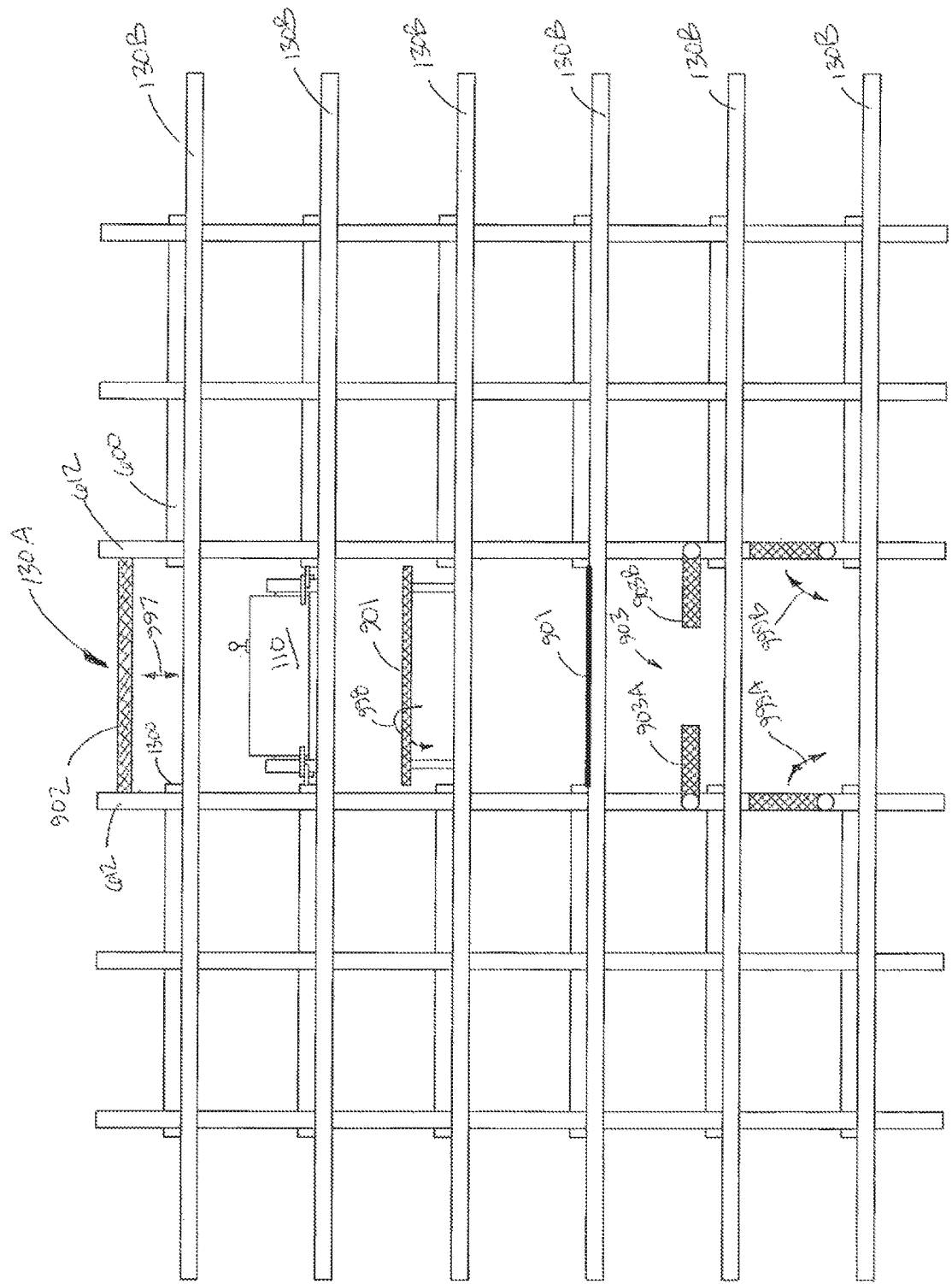
FIGS. 9-9B are schematic illustrations of portions of the storage and retrieval system in accordance with the embodiments.

Referring to FIGS. 8 and 9, examples of barriers that may be used, for example, in any suitable areas of the storage and retrieval system 100 that are, for example, substantially inaccessible to maintenance personnel when the system is operational are shown. These barriers may be actuated for blocking a bot pathway within the storage and retrieval system 100 when for example, a predetermined maintenance access zone is locked out and before maintenance personnel enter the locked out maintenance access zone (e.g. to substantially prevent bots 110 from entering the locked out maintenance access zone. The barriers may also be configured to allow maintenance personnel to actuate or otherwise put in place the barriers when the maintenance personnel are located within the maintenance access zone. In FIG. 8 one storage level of, for example, the storage and retrieval system 100 is shown but it should be understood that one or more levels of the storage and retrieval system may include barriers substantially similar to those described herein. Barriers 800-803 may be placed at any suitable location within the storage and retrieval system 100 and those barriers 800-803 shown in FIG. 8 are shown in exemplary locations only. It should be realized that the entrance/exit to each picking aisle 130A and each transfer area 895 may have a barrier located thereat. It should also be realized that while only one barrier 803 is shown on the transfer deck 130B, other barriers may be located on the transfer deck for separating the transfer deck 130B into any suitable number of maintenance access zones. For exemplary purposes only maintenance access zone Z3 is shown as including picking aisle 130A and as described above may extend above or below the storage level shown in FIG. 8 to include additional storage levels in a manner substantially similar to that shown in FIG. 6 with respect to maintenance access zones Z1 and Z2. Maintenance access zone Z5 is shown as including a transfer area 895 for a multilevel vertical conveyor 150. It is noted that with respect to the multilevel vertical conveyors 150 the maintenance access zone Z5 may extend to all of the transfer areas (e.g. vertical stack of transfer areas) associated with a particular multilevel vertical conveyor 150 being locked out so that the multilevel vertical conveyor 150 is inoperable or turned off when maintenance personnel are located in the transfer area 895 corresponding to the multilevel vertical conveyor 150. Maintenance access zone Z4 is shown as including a portion of the transfer deck 130B. In a manner similar to that described above with respect to FIG. 3, the maintenance access zones Z4 on the transfer deck 130B may be arranged so that at least a portion of the transfer deck 130B remains operational (e.g. for storing and retrieving cases) for allowing bots 110 to traverse the deck for accessing picking aisles 130A and transfer areas 895 associated with the operational portion of the transfer deck 130B.

The barriers 800-803 may be any suitable barriers configured to substantially prevent the passage of, for example, a bot 110 through (including passage above or below) the barrier. It is noted that while some exemplary barriers 901, 902, 903, 950 are described with respect to picking aisle 130A it should be understood that substantially similar barriers may also be located on the transfer deck 130B (see barrier 803) and at the entrance/exit of the transfer areas 895 (see barriers 801, 802).

In the embodiments the barrier 902 may be a substantially bar or gate like barrier that linearly raises and lowers for blocking, for example, an entrance/exit of for example, a storage level of picking aisle 130A. The barrier 902 may be raised or lowered in the direction of arrow 997 in any suitable manner and may be movably mounted in any suitable manner to, for example, vertical supports 612 of the storage and retrieval system 100. As may be realized when the barrier 902 is retracted it may be lowered below a surface of the transfer deck 130B and/or rails 1300 on which the bot 110 travels.

In the embodiments the barrier 901 may be a pivotable barrier. The barrier 901 may be substantially similar to barrier 902 but instead of being substantially linearly raised and lowered. The barrier 901 may be pivotally raised from a substantially horizontal orientation to a substantially vertical orientation in the direction of, for example, arrow 998. In this example, when the barrier is in a horizontal orientation the barrier is located partially within the transfer deck and may be substantially flush with or below a surface of the transfer deck 130B and/or picking aisle 130A on which the bot 110 travels. The barrier 901 may also be offset from the transfer deck 130B so that when in the horizontal orientation the barrier is located substantially entirely within the picking aisle. In one example, the direction in which the barrier 901 pivots may be such that if a bot 110 impacts the barrier 901 when trying to enter the picking aisle 130A, the barrier substantially cannot be pivoted to the horizontal position by the bot 110. The barrier 901 may also pivot in any suitable direction.

In the embodiments the barrier 903 may be in the form of one or more vertically pivotal barriers 903A, 903B. In this example the barrier 903 is shown as having two opposingly pivotable members 903A, 903B the barrier 903 may also have more or less than two vertically pivotable members. The one or more pivotable members may also be horizontally pivotable rather than vertically pivotable in a manner substantially similar to a door or gate. Each pivotable member 903A, 903B may be pivotally mounted in any suitable manner to a respective vertical support 612 of the storage and retrieval system and be drivingly pivoted in the direction of arrow 999A, 999B in any suitable manner between the open (e.g. bots are able to pass) and closed (bots are not able to pass) positions.

Figure 9A:
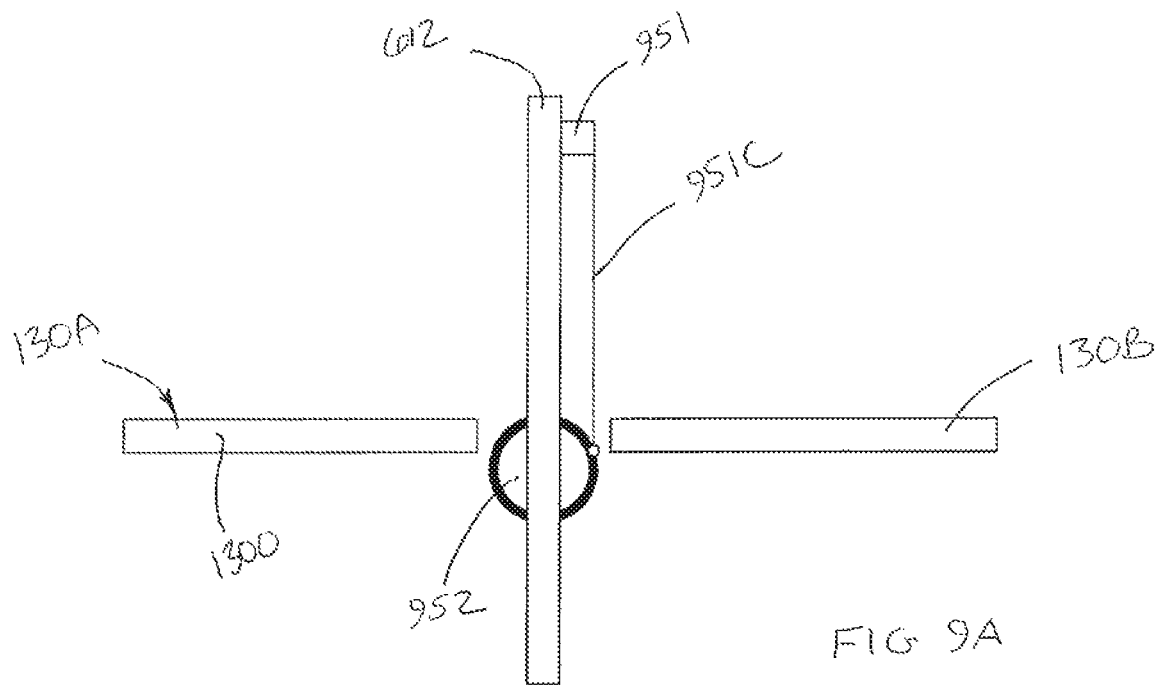
Figure 9B:
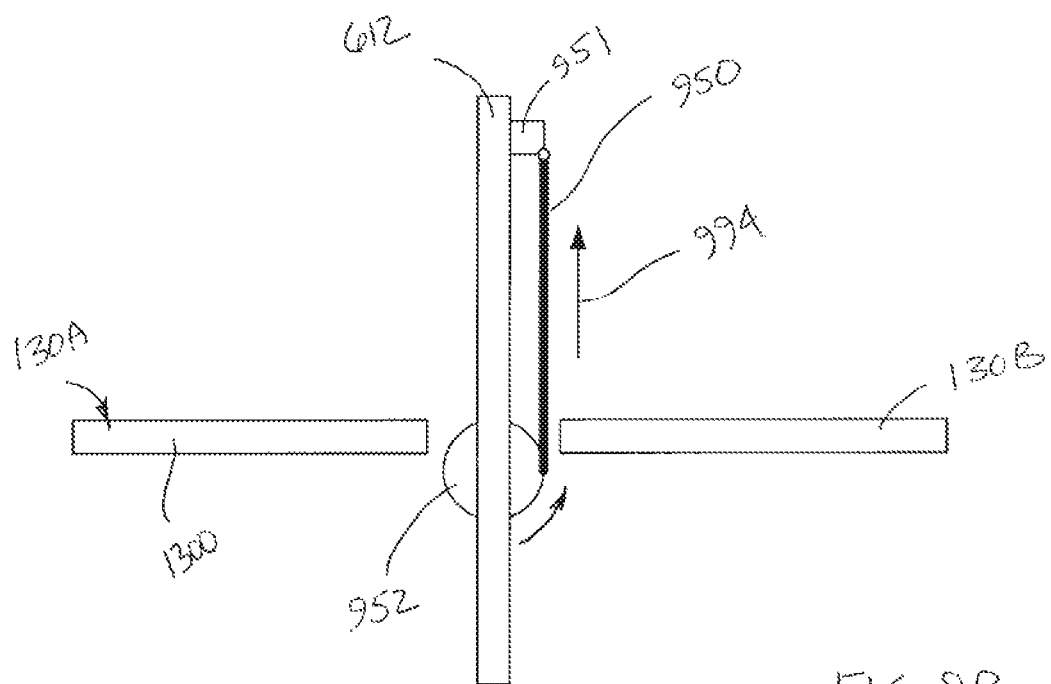

Referring also to FIGS. 9A and 9B, where screens, nets or other suitable flexible barriers are used, the barrier 950 may be rolled up around, for example, one or more drums 952 (or other suitable member capable of holding the barrier) and connected to one or more drive units 951 through a connecting member 951C. In one example the one or more drums 652 may be located substantially beneath the surfaces of the rails 1300 and the transfer deck 130B on which the bot 110 travels (e.g. on a storage level having a floor 130F, FIGS. 6 and 7) and the one or more drive units 951 may be located towards a top of a respective maintenance access zone (see e.g. zones Z1, Z2 in FIG. 6). In other examples the one or more drums 652 may be located substantially beneath the surfaces of the rails 1300 and the transfer deck 130B on which the bot 110 travels for each of the storage levels and the one or more drive units 951 may be located towards a top of each respective storage level. It is noted that the locations of the one or more drive units 951 and the one or more drums 952 may be reversed. The one or more drive units 951 may operate to retract the connecting member 951C in the direction of arrow 994. The connecting member may be attached in any suitable manner to the barrier 950 so that as the connecting member 951C is retracted the barrier 950 is unrolled from the drum 952 to so that the barrier spans substantially from the bot travel surfaces of a respective storage level (or of a storage level having a floor 130F) to substantially a top of a respective storage level (or substantially a top of a respective maintenance access zone) in a manner substantially similar to that shown in FIG. 7.

It should be understood that the barriers described herein are exemplary only and in alternate embodiments the barriers may be any suitable barriers that operate in any suitable manner. It should also be realized that the types of barrier used in the storage and retrieval system do not have to be uniform and that different types of barriers may be used in different areas of the storage and retrieval system.

Referring again to FIGS. 6 and 8, each maintenance access zone Z1-Z5 may have a control unit 680, 681. The control unit 680, 681 may be in communication with, for example, control server 120 (FIG. 1) in any suitable manner such as through a wired or wireless communication network. It should be understood that while only two control units 680, 681 are shown with respect to maintenance access zones Z1, Z2 the other maintenance access zones may include substantially similar control units. It should also be understood that while the control units 680, 681 are shown as being located at an entrance to the maintenance access zone (e.g. in FIG. 6 the entrance may be at the end of the picking aisles) the control units may be centrally located. Each control unit may include a switch 660. The switch may be configured such that once activated by a maintenance person a part of the switch (or other feature of the control unit) is removed from the control unit 680, 681 to substantially prevent deactivation of the switch by other maintenance personnel (e.g. the switch cannot be deactivated without replacing the removed part of the switch/control unit). In other examples the switch may include a "lock out" feature through which a locking device may be inserted through the switch and a fixed portion of, for example, the control unit housing so prevent deactivation of the switch (e.g. to deactivate the switch the locking device has to be removed). It should be understood that the switch may have any suitable configuration.

Figure 10:
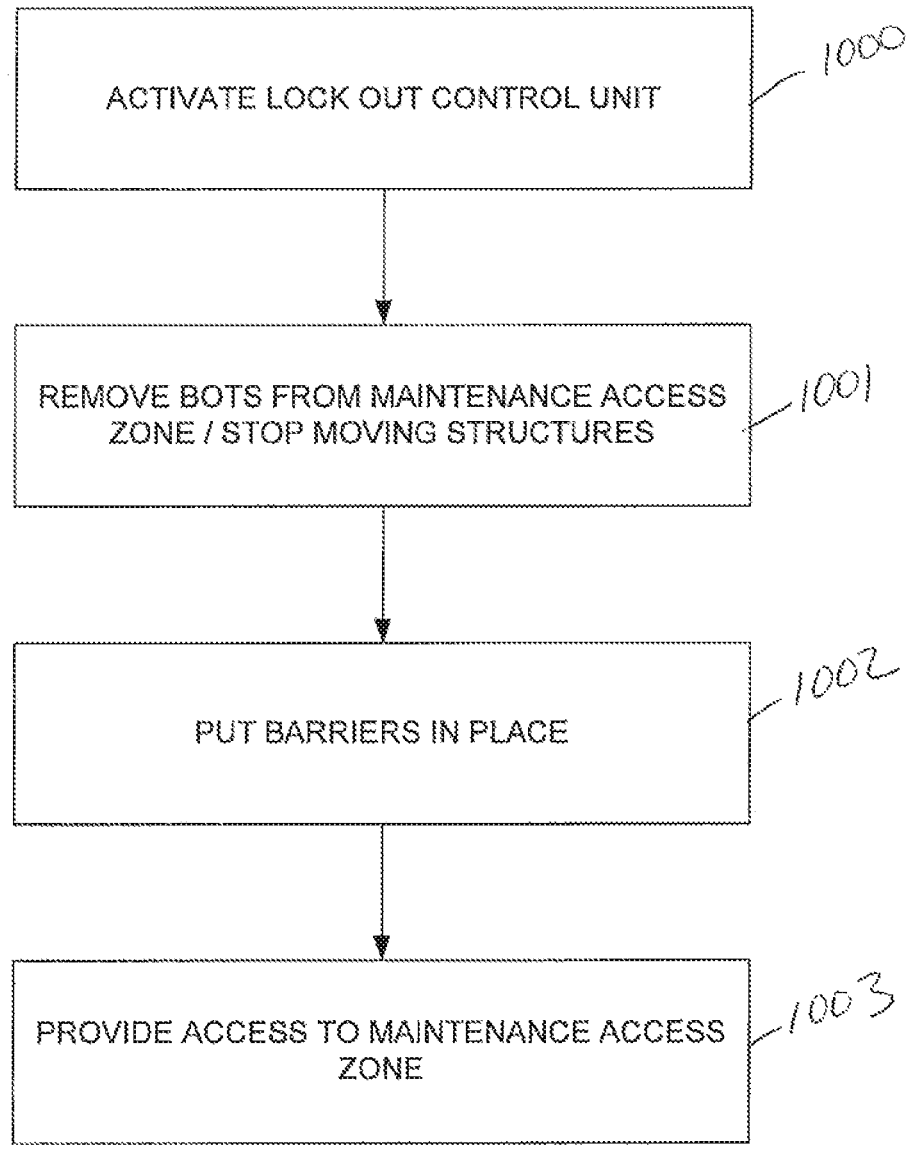
FIG. 10 is an exemplary flow chart in accordance with the embodiments.

Referring to FIGS. 6, 8 and 10 in operation a maintenance person activates the switch 660 of a desired maintenance access zone Z1-Z5 (FIG. 10, Block 1000). Upon activation of the switch 660 a communication signal is sent from the respective control unit 680, 681 to, for example, the control server 120 (FIG. 1). The control server 120 may send instructions to any bots 110 located within the desired maintenance access zone Z1-Z5 to exit or otherwise leave the desired maintenance access zone. If an operational bot 110 is not able to leave the desired maintenance access zone (e.g. due to a malfunction of the bot, a blockage in the picking aisle, etc.) the control server 120 may effect the shutting down of the bot 110. In addition to or in lieu of instructing the operational bots 110 to leave the desired maintenance access zone the control server may effect a shutting down of the bots 110 within the maintenance access zone (e.g. bots that are carrying cases may leave the zone while bots that are not carrying cases may shut down). If the desired maintenance access zone also includes moving components of the storage and retrieval system, such as for example, the multilevel vertical conveyors 150, the control server 120 may also send instructions to the multilevel vertical conveyor(s) within the desired maintenance access zone Z1-Z5 for stopping or otherwise shutting down the multilevel vertical conveyor(s). (FIG. 10, Block 1001). The control server 120 may effect the placement of the barriers 800-803 associated with the desired maintenance access zone Z1-Z5 in any suitable manner (FIG. 10, Block 1002). For example, the control server 120 may effect activation of any suitable drive units for rotating, pivoting, unrolling, etc. the barriers 800-803 (e.g. as described above with respect to FIGS. 9-9B) so that the activated barriers substantially block the entrance/exit of the desired maintenance access zone Z1-Z5 to substantially prevent bots 110 from entering the desired maintenance access zone Z1-Z5. The barriers, such as nets 700, 701 (FIG. 7) located between the maintenance access gateways 210A, 210B, 310A, 310B, 310C (FIGS. 2 and 3) which provide access to the maintenance access zones Z1-Z5 may be removed or otherwise opened to allow maintenance personnel to enter the desired maintenance access zone Z1-Z5 (FIG. 10, Block 1003). In the embodiments the opening of the barriers 700, 701 for allowing maintenance personnel to enter the maintenance access zone may be performed by the maintenance personnel and/or the barriers 700, 701 may be automated (in a manner substantially similar to that described above with respect to FIGS. 9-9B) such that the barriers 700, 701 are opened substantially after the barrier(s) 800-803 are in place for substantially preventing bots from entering the maintenance access zone. It should be understood that the barriers may be opened or removed to allow access into or from a respective maintenance access zone in any suitable manner.

In accordance with a first aspect of the disclosed embodiment a maintenance access system for a storage and retrieval space and automated transport vehicles disposed in the storage and retrieval space is provided. The maintenance access system includes at least one maintenance access control unit associated with a portion of the storage and retrieval space, at least one barrier located in the storage and retrieval space and defining a boundary of the portion of the storage and retrieval space, the at least one barrier being configured to substantially prevent the passage of the automated transport vehicles past the at least one barrier, and a controller connected to the maintenance access control unit, the controller being configured to receive a signal from the at least one maintenance access control unit for isolating the portion of the storage and retrieval space associated with the at least one maintenance access control unit, where the controller in response to the signal closes the at least one barrier isolating the portion of the storage and retrieval space and effects the removal from or shutting down of autonomous transport vehicles within the portion of the storage and retrieval space.

In accordance with the first aspect of the disclosed embodiment, the portion of the storage and retrieval space forms a maintenance access zone including at least one picking aisle of the storage and retrieval space where the at least one picking aisle is arranged in a vertical stack of picking aisles.

In accordance with the first aspect of the disclosed embodiment, the portion of the storage and retrieval space forms a maintenance access zone including a transfer deck of the storage and retrieval space, where the transfer deck provides the autonomous transport vehicles access to one or more picking aisles and/or one or more multilevel vertical conveyor transfer areas.

In accordance with the first aspect of the disclosed embodiment, the portion of the storage and retrieval system space forms a maintenance access zone including a multilevel conveyor transfer area where the multilevel conveyor transfer area allows the autonomous transport vehicles to transfer cases between the multilevel vertical conveyor and the picking aisles.

In accordance with a first sub-aspect of the first aspect of the disclosed embodiment, the storage and retrieval space includes multiple storage levels, each level including picking aisles, a transfer deck common to each picking aisle and multilevel vertical conveyor transfer areas connected to the transfer deck. The maintenance access system further including at least one barrier located at one or more of an end of at least one of the picking aisles, an entrance/exit of the multilevel vertical conveyor transfer areas and within the transfer deck.

In accordance with the first sub-aspect of the first aspect of the disclosed embodiment, the barriers include one or more of nets, fences and screens.

In accordance with the first sub-aspect of the first aspect of the disclosed embodiment, the barriers are motorized barriers that are actuated to substantially block the one or more of the end of at least one of the picking aisles, the entrance/exit of the multilevel vertical conveyor transfer areas and at least portions of the transfer deck.

In accordance with the first aspect of the disclosed embodiment, the portion of the storage and retrieval space forms a maintenance access zone the includes multiple picking aisles arranged in a vertical stack, where the picking aisle at the bottom of the stack includes a floor and the picking aisles above the picking aisle at the bottom of the stack within the maintenance access zone are substantially floorless.

In accordance with a second aspect of the disclosed embodiment a storage and retrieval system includes a multilevel storage structure including a plurality of storage locations arranged on sides of picking aisles where the picking aisles are connected to each other and at least one multilevel vertical conveyor by a transfer deck; at least one autonomous transport vehicle configured to travel along the picking aisles and transfer deck for transferring case units between the storage locations and the at least one conveyor; and a maintenance access system including vertically stacked maintenance access zones disposed coincident with the picking aisles, where each maintenance access zone provides access to at least multiple levels of picking aisles and storage locations corresponding to the multiple levels of picking aisles.

In accordance with the second aspect of the disclosed embodiment, the multiple levels of picking aisles are arranged in a vertical stack and the picking aisle at the bottom of the stack includes a floor and the picking aisles above the picking aisle at the bottom of the stack for a respective maintenance access zone are substantially floorless.

In accordance with a first sub-aspect of the second aspect of the disclosed embodiment, the storage and retrieval system further includes at least one maintenance access control unit; at least one barrier corresponding to a respective maintenance access zone, the at least one barrier being configured to substantially prevent the passage of the automated transport vehicles past the at least one barrier; and a controller connected to the maintenance access control unit, the controller being configured to receive a signal from the at least one maintenance access control unit for isolating a portion of the storage and retrieval system associated with the at least one maintenance access control unit where the controller effects the removal from or shutting down of autonomous transport vehicles within the portion of the storage and retrieval system.

In accordance with a first sub-aspect of the second aspect of the disclosed embodiment, each of the at least one multilevel vertical conveyor includes a transfer area and the at least one barrier is disposed at one or more of an end of at least one of the picking aisles, an entrance/exit of the multilevel vertical conveyor transfer area and within the transfer deck.

In accordance with a first sub-aspect of the second aspect of the disclosed embodiment, the at least one barrier includes one or more of nets, fences and screens.

In accordance with a first sub-aspect of the second aspect of the disclosed embodiment, the at least one barrier comprises at least one motorized barrier that is actuated to substantially block the one or more of the end of at least one of the picking aisles, the entrance/exit of the multilevel vertical conveyor transfer areas and at least portions of the transfer deck.

In accordance with the second aspect of the disclosed embodiment, the storage and retrieval system further includes at least one maintenance personnel cart configured to allow maintenance personnel to traverse the maintenance access zones.

In accordance with the second aspect of the disclosed embodiment, the transfer deck comprises multiple maintenance access zones configured such that a portion of the transfer deck associated with one maintenance access zone can be disabled while another portion of the transfer deck associated with another maintenance access zone remains operational.

It should be understood that the exemplary embodiments disclosed herein can be used individually or in any suitable combination thereof. It should also be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. An autonomous guided vehicle for transporting cases in a logistic facility, the autonomous guided vehicle comprising:
    an autonomous transport vehicle frame;
    a logistics case support disposed on the autonomous transport vehicle frame, the logistics case support, being disposed to hold a case on the autonomous guided vehicle, and having transfer fingers arranged so as to interface between slats of slatted case support racks, of the logistic facility, and pass substantially vertically between the slats; and
    a lift mounted to the autonomous transport vehicle frame and configured to raise and lower the transfer fingers, of the logistics case support, so that the transfer fingers pass between the slats and effect transfer of the case between the slatted case support racks and the autonomous guided vehicle via raising and lowering the transfer fingers.

2. The autonomous guided vehicle of claim 1, wherein the lift is disposed between the logistics case support and the autonomous transport vehicle frame of the autonomous guided vehicle.

3. The autonomous guided vehicle of claim 1, wherein raising and lowering of the transfer fingers, passes the transfer fingers substantially vertically in-between slats so that the transfer fingers pass at least in part through the slatted case support racks.

4. The autonomous guided vehicle of claim 1, wherein the transfer fingers passing at least in part through the slatted case support racks, raise and lower the case on and off a case support surface of the slatted case support racks and effecting transfer of the case between the autonomous guided vehicle and slatted case support racks.

5. The autonomous guided vehicle of claim 1, wherein the lift includes a drive system configured to raise and lower the transfer fingers.

6. The autonomous guided vehicle of claim 1, wherein the drive system comprises a single axis drive common to all transfer fingers and configured to move the transfer fingers along a first axis.

7. The autonomous guided vehicle of claim 1, wherein the transfer fingers are configured to support one or more cases during transfer between the slatted case support racks and the autonomous guided vehicle.

8. A method for transporting cases in a logistic facility with an autonomous guided vehicle, the method comprising:
    providing an autonomous transport vehicle frame;
    providing a logistics case support disposed on the autonomous transport vehicle frame, the logistics case support, being disposed for holding a case on the autonomous guided vehicle, and having transfer fingers arranged so as to interface between slats of slatted case support racks, of the logistic facility, and pass substantially vertically between the slats; and
    providing a lift mounted to the autonomous transport vehicle frame for raising and lowering the transfer fingers, of the logistics case support, so that the transfer fingers pass between the slats; and
    effecting transfer of the case between the slatted case support racks and the autonomous guided vehicle via raising and lowering the transfer fingers.

9. The method of claim 8, wherein the lift is disposed between the logistics case support and the autonomous transport vehicle frame of the autonomous guided vehicle.

10. The method of claim 8, wherein raising and lowering of the transfer fingers, passes the transfer fingers substantially vertically in-between slats so that the transfer fingers pass at least in part through the slatted case support racks.

11. The method of claim 8, wherein the transfer fingers passing at least in part through the slatted case support racks, raise and lower the case on and off a case support surface of the slatted case support racks and effecting transfer of the case between the autonomous guided vehicle and slatted case support racks.

12. The method of claim 8, wherein the lift includes a drive system for raising and lowering the transfer fingers.

13. The method of claim 8, wherein the drive system comprises a single axis drive common to all transfer fingers and configured for moving the transfer fingers along a first axis.

14. The method of claim 8, wherein the transfer fingers are configured for supporting one or more cases during transfer between the slatted case support racks and the autonomous guided vehicle.

* * * * *